US010540799B2

(12) United States Patent
Yamamoto et al.

(10) Patent No.: US 10,540,799 B2
(45) Date of Patent: Jan. 21, 2020

(54) IMAGE PROCESSING APPARATUS, IMAGE PROCESSING METHOD, AND RECORDING MEDIUM

(71) Applicant: RICOH COMPANY, LTD., Tokyo (JP)

(72) Inventors: Hiroki Yamamoto, Tokyo (JP); Yasumasa Ando, Tokyo (JP); Fumiko Tsuwano, Tokyo (JP); Yoshikazu Itoh, Kanagawa (JP); Yuko Shimizu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 15/628,760

(22) Filed: Jun. 21, 2017

(65) Prior Publication Data

US 2018/0012388 A1 Jan. 11, 2018

(30) Foreign Application Priority Data

Jul. 5, 2016 (JP) .................................. 2016-133722

(51) Int. Cl.
| | |
|---|---|
| *G06T 11/80* | (2006.01) |
| *G06T 11/00* | (2006.01) |
| *G06T 11/60* | (2006.01) |
| *G11B 27/031* | (2006.01) |
| *G06F 3/0481* | (2013.01) |

(52) U.S. Cl.
CPC ............ *G06T 11/80* (2013.01); *G06T 11/001* (2013.01); *G06T 11/60* (2013.01); *G11B 27/031* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 2015/0109323 | A1* | 4/2015 | Johnson | G09G 5/026 |
| | | | | 345/594 |
| 2016/0147721 | A1* | 5/2016 | Gilra | G06F 17/24 |
| | | | | 715/229 |

FOREIGN PATENT DOCUMENTS

| | | |
|---|---|---|
| JP | 2011-248478 | 12/2011 |
| JP | 2014-056455 | 3/2014 |

* cited by examiner

*Primary Examiner* — Kevin Ky
(74) *Attorney, Agent, or Firm* — Oblon, McClelland, Maier & Neustadt, L.L.P.

(57) ABSTRACT

An image processing apparatus receives operational information indicating a content of each of user operations sequentially performed to generate or edit an object using any of guest tools; for each operational information, determine one of the guest tools that a user has used to perform the user operation indicated by the operational information; in response to receiving each operational information, register processing information including the operational information in one of a plurality of processing lists for the determined guest tool; in response to receiving each operational information, point with a pointer the processing information including the currently received operational information; and display a display image including the object, generated by sequentially performing editing according to the first-registered processing information to the currently-received processing information registered in each of the processing lists for the plurality of guest tools.

8 Claims, 15 Drawing Sheets

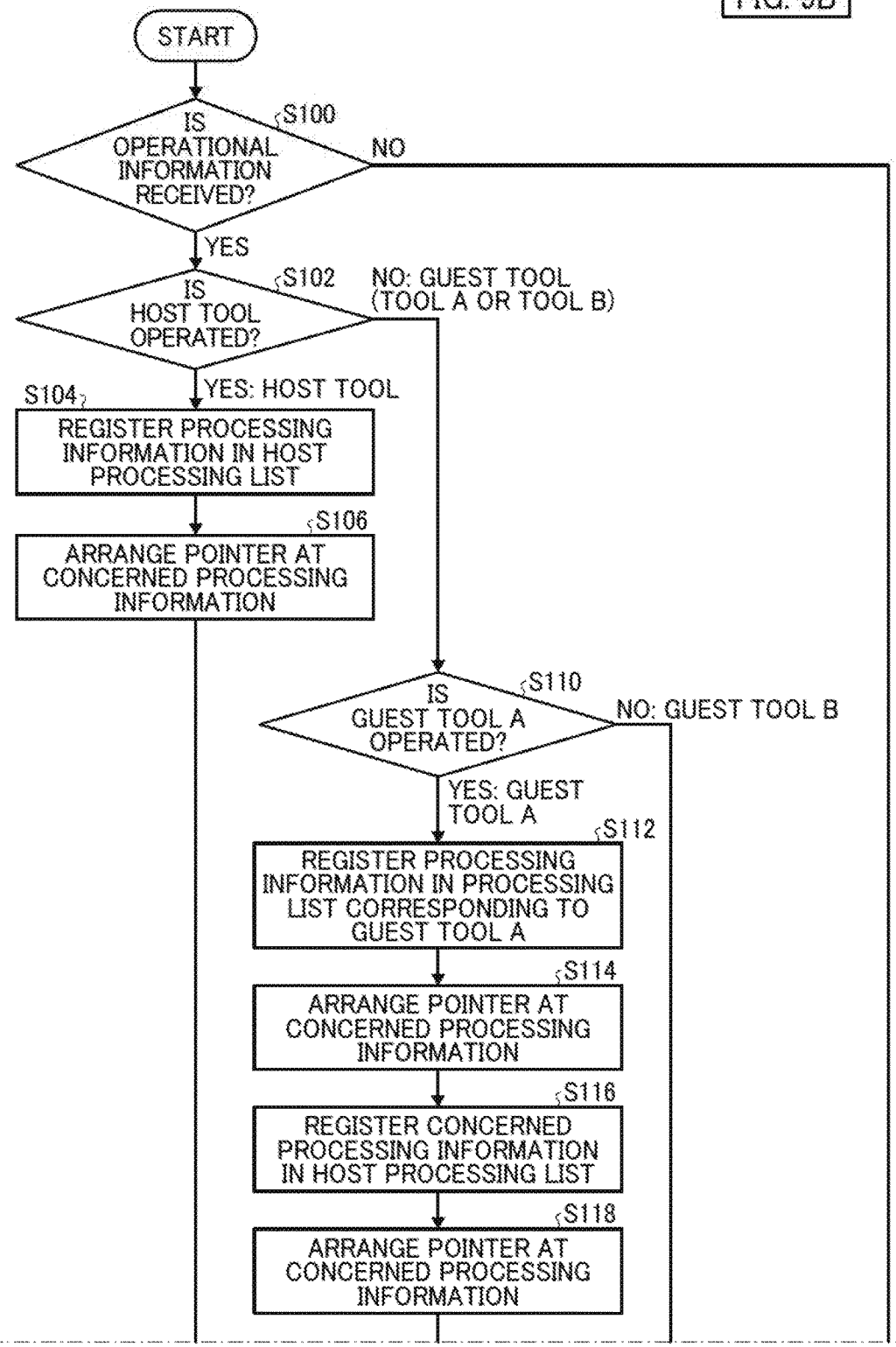

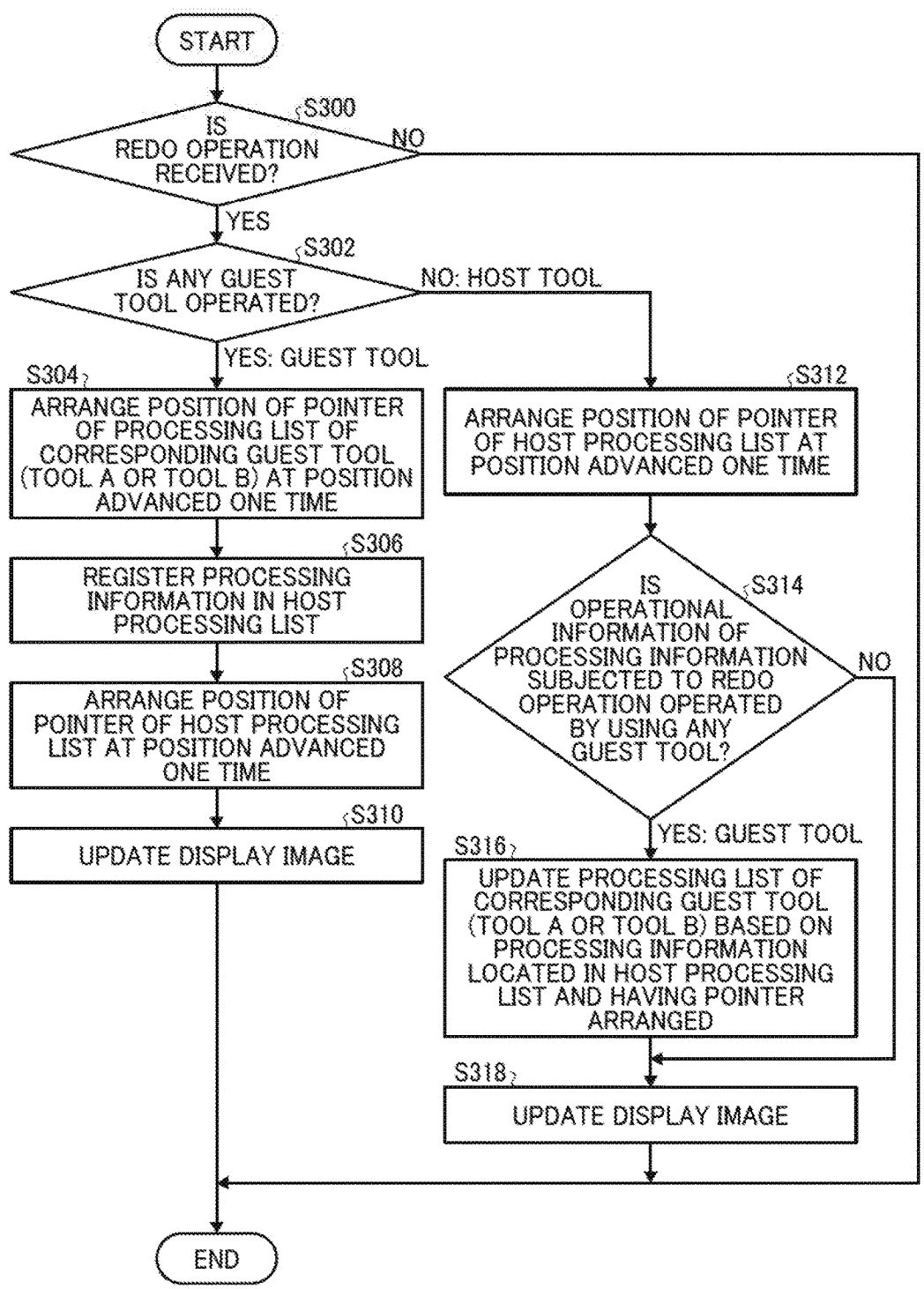

IMAGE PROCESSING APPARATUS, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-133722, filed on Jul. 5, 2016, in the Japan Patent Office, the entire disclosure of which is hereby incorporated by reference herein.

BACKGROUND

Technical Field

The present invention relates to an image processing apparatus, an image processing method, and a storage medium.

Description of the Related Art

There is a known technology in which an image editing application is used to create an object and edit a color and a shape of an object.

For example, disclosed is a technology in which image editing is performed by using an editing tool to provide various functions for image editing. A user provides an operation command to create, edit, and the like for an object via the editing tool. The object is subjected to editing processing on an application side in accordance with the operation command. Additionally, there is a known technology in which a plurality of image processing is sequentially applied and afterward any one of the plurality of image processing is tracked back to redo or undo the editing.

Additionally, a plurality of guest tools (plug-in) is installed in the application to provide extended editing functions. In this case, the user provides an operation command for image editing via each of the plurality of guest tools.

SUMMARY

Example embodiments of the present invention include an image processing apparatus comprising circuitry to: receive a plurality of items of operational information sequentially, each operational information of one or more items of operational information indicating a content of each one of a plurality of user operations sequentially performed to generate or edit an object using any one of a plurality of guest tools providing extended editing functions; for each item of operational information, determine one of the plurality of guest tools that a user has used to perform the content of the user operation indicated by the operational information; in response to receiving each item of operational information, register processing information including the operational information in one of a plurality of processing lists corresponding to the determined guest tool, such that a plurality of items of processing information is registered in the plurality of processing lists for the plurality of guest tools in receiving order; in response to receiving each item of operational information, point with a pointer the processing information including the currently received operational information; and display a display image including the object subject to the user operations, the object of the display image being generated by sequentially performing editing according to one or more items of processing information, from the first-registered processing information to the currently-received processing information, registered in each one of the plurality of processing lists for the plurality of guest tools.

Embodiments of the present invention include an image processing method and a non-transitory recording medium storing an image processing control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 9A and 9B (FIG. 9) are a flowchart illustrating a procedure of image processing;

FIG. 11 is a flowchart illustrating an exemplary procedure of interrupt handling in the case of receiving redo operation.

Figure 1:
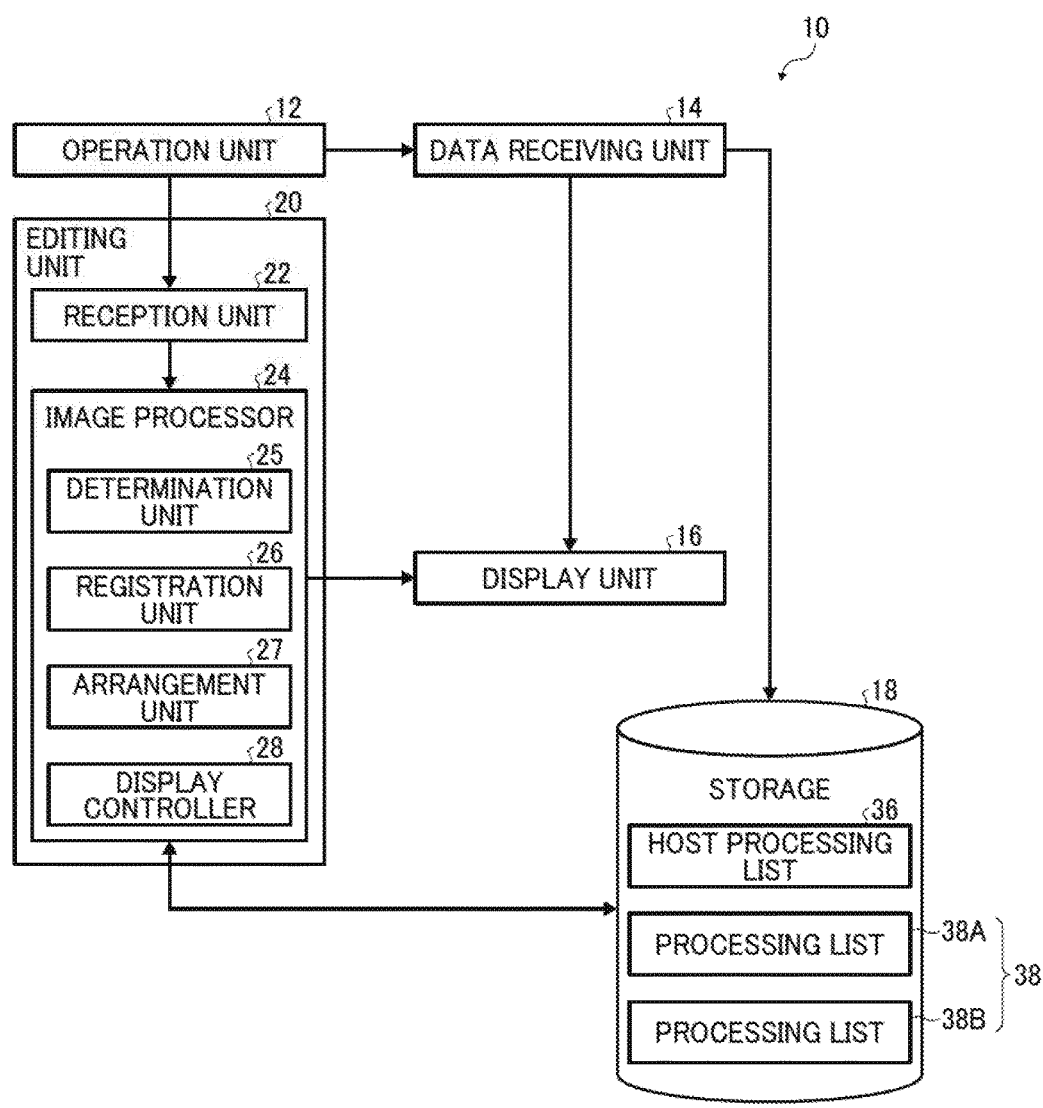
FIG. 1 is a block diagram illustrating an exemplary functional configuration of an image processing apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following, embodiments of an image processing apparatus, an image processing method, and an image processing program having a medium recorded in according to the present invention will be described in detail with reference to the attached drawings.

FIG. 1 is a block diagram illustrating an exemplary functional configuration of an image processing, apparatus 10. In this embodiment, the image processing apparatus 10 is a device to edit an image.

The image processing apparatus 10 includes an operation unit 12, a data receiving unit 14, an editing unit 20, a display unit 16, and a storage 18.

The operation unit 12 is an input device to be operated by a user. The operation unit 12 includes, for example, a keyboard, a mouse, and the like. In the following, a description will be provided by exemplifying a case where the operation unit 12 includes a mouse.

The data receiving unit 14 reads, from a memory not illustrated, electronic data (such as image data stored in a memory) designated in accordance with operation at the operation unit 12, and stores the read image data in the storage 18. Additionally the data receiving unit 14 provides control to display the read image data on the display unit 16.

The display unit 16 is a device to display various kinds of images. The display unit 16 includes, for example, a liquid crystal display device and the like. The storage 18 is a device to record various kinds of data. The storage 18 is a storage medium such as a hard disk drive (HDD) or a flash memory:

An application to edit an image is preliminarily installed in the image processing apparatus 10. The application includes, for example, Illustrator, Acrobat, and the like sold by Adobe Systems Incorporated, but not limited thereto. The data receiving unit 14 displays, on the display unit 16, an operation screen displayed by executing the application. A user inputs an operation command via the operation screen, and creates or edits an object.

The application has a host tool introduced in older to provide basic fractions related to image editing. The host tool is a program to provide the basic functions related to image editing, and the program is integrated in the application.

Additionally, the image processing apparatus 10 has a plurality of guest tools installed in order to expand image editing functionality of the application. The guest tool is a plug-in to provide one or more extended functions related to image editing. In other words, the guest tools actuate inside the application and provide one or more kinds of functions related to image editing.

In this disclosure, in the case of describing the guest tools and the host tool collectively, these tools may be simply referred to as tools for simplicity. Additionally, in the case of describing the basic functions and the extended functions collectively, these functions may be simply referred to as functions for simplicity.

The functions related to image editing include, for example, object editing functions (editing functions for a color, a shape, arrangement, a pattern, a line type, and the like), a new object creating function, and the like. In the present embodiment, the guest tools provide multiple kinds of functions (i.e., a group of functions).

A user can perform operation related to image editing for an object by using each of the host tool and the plurality of guest tools via the operation screen.

Figure 2:
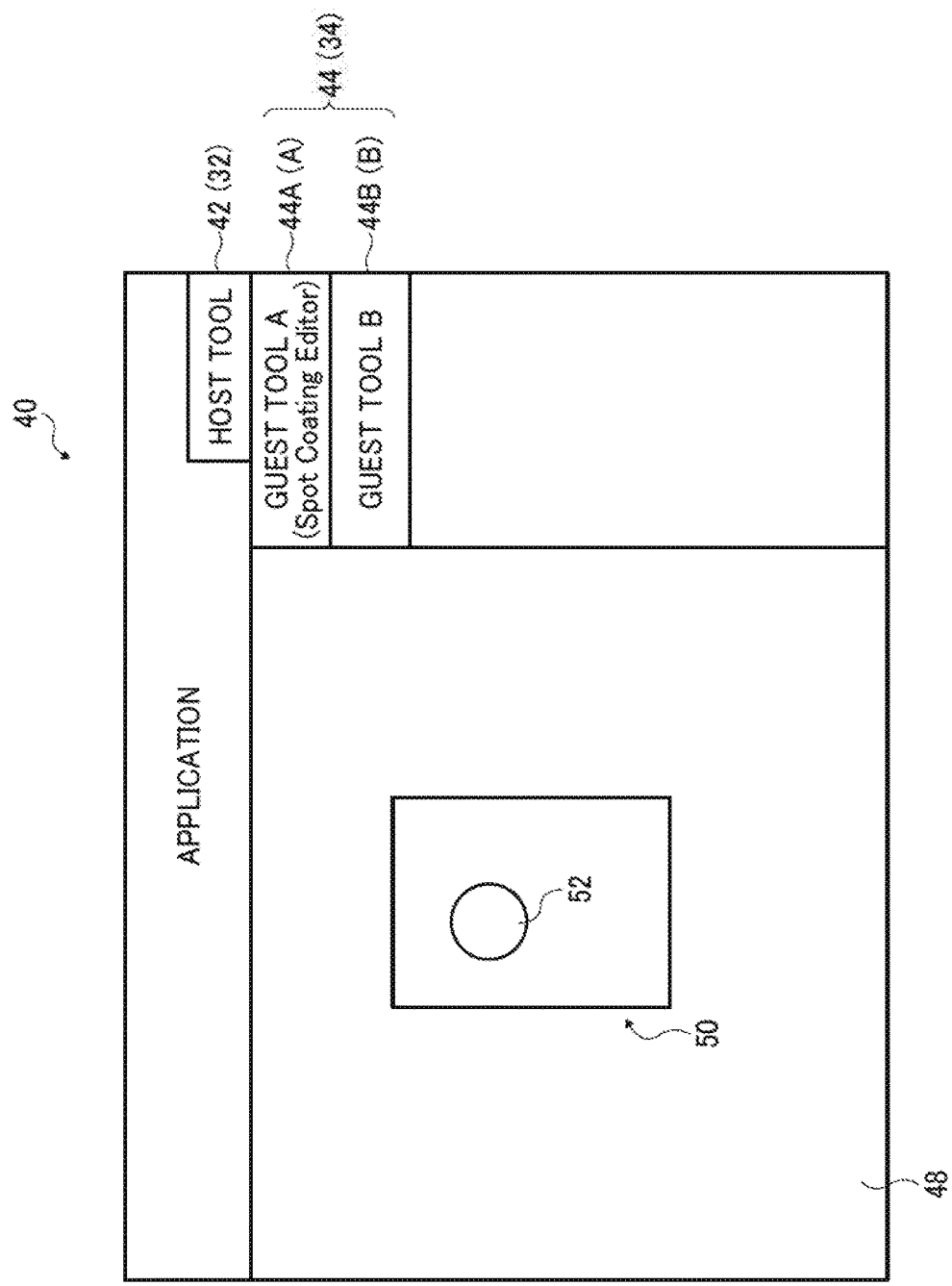
FIG. 2 is a schematic diagram illustrating an example of an operation screen.

FIG. 2 is a schematic diagram illustrating an example of an operation screen 40. As illustrated in FIG. 2, the operation screen 40 includes a drawing area 48. The drawing area 48 is an area operated by a user during image editing. A display image 50 including an object 52 edited/created by operation at the operation unit 12 by the user is displayed in the drawing area 48.

A host tool bar 42 and a guest tool bar 44 are displayed in a periphery of the drawing area 48 on the operation screen 40.

The host tool bar 42 is a tool bar to call each of basic functions provided by a host tool 32. A list of the basic functions related to image editing integrated in the application is displayed in the host tool bar 42. For example, an icon image indicating each of the basic functions is displayed in the host tool bar 42.

The user operates the operation unit 12 to provide a command for any one of the basic functions displayed in the host tool bar 42 and further operate the drawing area 48. Consequently, the commanded basic function is called, and the user can perform image editing using the basic function. For example, the user uses the basic functions to perform operation related to creation of a new object, and designation and change of a color, a shape, arrangement, a pattern, a line type, and the like of an object displayed in the drawing area 48.

The guest tool bar 44 is a toolbar to call each of the extended functions provided by the guest tool 34. A list of the extended functions provided by the guest tool 34 is displayed in the guest tool bar 44. For example, an icon image indicating each of the extended functions is displayed in the guest tool bar 44.

In the present embodiment, a description will be provided assuming an example in which two kinds of guest tools 34 (guest tool A and guest tool B) are added to the application. Note that three or more kinds of guest tools 34 may also be added. Additionally, a new guest tool 34 may also be added as needed in accordance with operation at the operation unit 12 by the user.

Specifically, in the present embodiment, the description will be provided assuming that the two kinds of guest tools 34 (guest tool A and guest tool B) are added to the application.

Therefore, in the present embodiment, a guest tool bar 44A and a guest tool bar 44B are displayed on the operation screen 40 as the guest tool bars 44.

The guest tool bar 44A is a toolbar to call each of the extended functions provided by the guest tool A. A list of the extended functions provided by the guest tool A is displayed in the guest tool bar 44A. For example, an icon image indicating each of the extended functions is displayed in the guest tool bar 44A.

The user operates the operation unit 12 to provide a command for any one of the extended functions displayed in the guest tool bar 44A and further operate the drawing area 48. Consequently, the commanded extended function is called, and the user can perform image editing using the extended function. For example, the user uses the extended functions to perform operation related to creation of a new object, and designation and change of a color, a shape, arrangement, a pattern, a line type, and the like of an object displayed in the drawing area 48.

In a similar manner, the guest tool bar 44B is a toolbar to call each of the extended functions provided by the guest tool B. A list of the extended functions provided by the guest tool B is displayed in the guest tool bar 44B. For example, an icon image indicating each of the extended functions is displayed in the guest tool bar 44B.

The user operates the operation unit 12 to provide a command for any one of the extended functions displayed in guest tool bar 44B and further operate the drawing area 48. Consequently, the commanded extended function is called, and the user can perform image editing using the extended function. For example, the user uses the extended functions to perform operation related to creation of a new object, designation and change of a color, a shape, arrangement, a pattern, a line type, and the like for an object displayed in the drawing area 48.

Note that the plurality of guest tools 34 is independent from each other. In other words, an operation command performed by using one of the plurality of guest tools 34 does not influence an operation command performed by using another guest tool 34. On the other hand, an operation command executed by using the host tool 32 influences all of the plurality of guest tools 34.

Additionally, in the present embodiment, the description will be provided assuming that a display image 50 has a data format of a portable document format (PDF). Note that the data format of the display image 50 is not limited to the PDF.

Referring back to FIG. 1, the description will be continued. The editing unit 20 performs editing processing for an image in accordance with operation at the operation unit 12 by the user. The editing processing includes not only editing of an object 52 already created but also creation of a new object 52. In other words, the editing unit 20 creates the new object 52 and edits the object 52.

The editing unit 20 includes a reception unit 22 and an image processor 24.

The reception unit 22 receives operational information indicating operational content of a user.

Particularly, the reception unit 22 receives operational information indicating operational content operated for the object 52 by the user by using any one of the plurality of guest tools 34. Specifically, the reception unit 22 receives operational information indicating operational content operated by using the extended functions provided by the guest tools 34.

The operational information includes, for example, identifying information of the guest tool 34 used for operation, a used extended function, and operated content (a color, a shape, arrangement (positional information), a pattern, a line type, and the like of a created or changed object 52).

Additionally, the reception unit 22 receives operational information indicating operational content operated by the user for the object 52 by using the host tool 32. Particularly, the reception unit 22 receives operational information indicating operational content operated by the user for the object 52 by using the host tool 32.

Furthermore, the reception unit 22 receives undo operation or redo operation by the user via any one of the plurality of guest tools 34. In addition, the reception unit 22 receives undo operation or redo operation by the user via the host tool 32.

The undo operation indicates operation at the time of providing a command to undo editing processing that has been performed. The redo operation indicates operation at the time of providing a command to redo the editing processing that has been undone once.

Each of the host tool bar 42 and guest tool bar 44 includes: an icon image indicating an undo function in order to provide a command for the undo operation; and an icon image indicating a redo function in order to provide a command for the redo operation.

The user designates the icon image indicating the undo function or the icon image indicating the redo function in the host tool bar 42 or the guest tool bar 44. Consequently, the reception unit 22 receives the undo operation and the redo operation via each of the host tool 32 and the guest tools 34 (guest tool A and guest tool B).

The image processor 24 edits an image in accordance with the operational information, undo operation, redo operation, and the like received in the reception unit 22. The image processor 24 includes a determination unit 25, a registration unit 26, an arrangement unit 27, and a display controller 28.

The determination unit 25 determines whether the host tool 32 is used and whether any one of the guest tools 34 is used to operate operational content indicating operational information received in the reception unit 22. Additionally, the determination unit 25 determines a guest tool 34 used to operate the operational content indicating the operational information received in the reception unit 22.

Therefore, the determination unit 25 determines whether any one of the host tool 32, guest tool A, and guest tool B is used to operate the operational content indicating the operational information received in the reception unit 22.

For example, the determination unit 25 makes such determination by identifying a tool selected at the time of performing operation of the received operational information.

The registration unit 26 controls a processing list for each of the guest tools 34. In addition, the registration unit 26 controls a host processing list corresponding to the host tool 32.

The processing list is made by registering processing information corresponding to each of operational information in receiving order of the operational information. The registration unit 26 controls a guest tool 34 and a processing list on a one-to-one basis. In the present embodiment, the registration unit 26 controls a processing list corresponding to the guest tool A and a processing list corresponding to the guest tool B.

Similar to the processing list, the host processing list is made by registering processing information corresponding to each of operational information in receiving order of the operational information. However, both of processing information including operational information operated by using the host tool 32 and processing information including operational information operated by using each of the guest tools 34 are registered in the host processing list in receiving order of the operational information.

Figure 3:
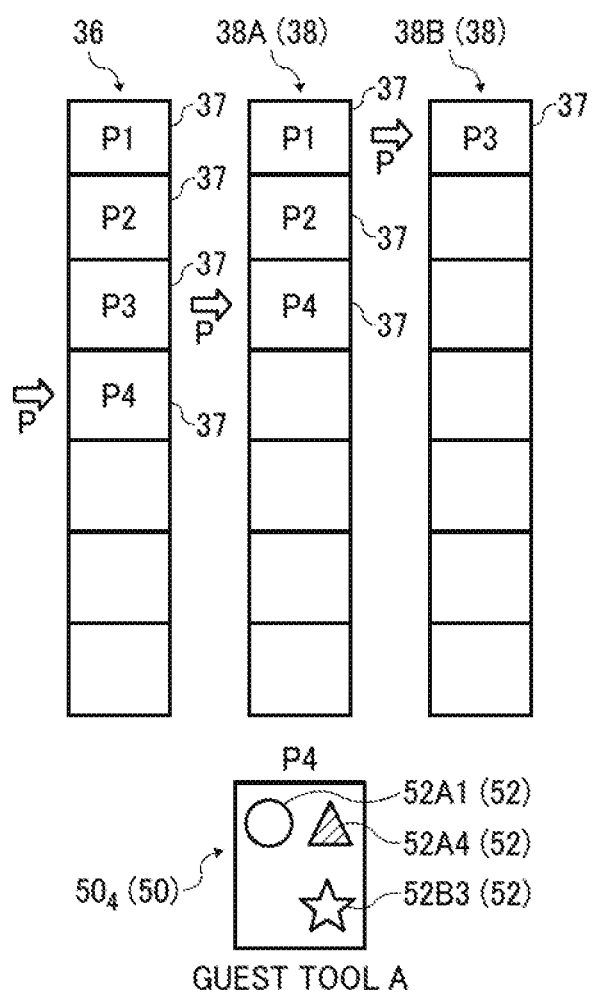
FIG. 3 is a schematic diagram illustrating an example in each of a host processing list and processing lists.

FIG. 3 is a schematic diagram illustrating an example in each of a host processing list 36 and processing lists 38 (processing list 38A and processing list 38B).

The host processing list 36 is a processing list corresponding to the host tool 32. The processing list 38A is a processing list 38 corresponding to the guest tool A. The processing list 38B is a processing list 38 corresponding to the guest tool B.

Note that the registration unit 26 may only need to control the processing list 38 corresponding to each of the guest tools 34 and may not need to constantly control the host processing list 36.

Processing information 37 corresponding to each operation at the operation unit 12 by a user is registered in each of the host processing list 36, processing list 38A, and processing list 38B.

In the example illustrated in FIG. 3, processing information 37 respectively including operational information of "operation 1 ("P1")" to "operation 4 ("P4")" is registered in the processing lists 38 (processing list 38A and processing list 38B). The operational information of the "operation 1 ("P1")" to the "operation 4 ("P4")" indicates operational content from first operation to fourth operation using the guest tools 34. The registration unit 26 registers the processing information 37 in receiving order of the operational information in the processing list 38 corresponding to the guest tool 34 used to operate operational content indicated by operational information included in the processing information 37.

Additionally, the processing information 37 respectively including the operational information of the "operation 1 ("P1")" to the "operation 4 ("P4")", namely, the first operation to the fourth operation using the host tool 32 and the guest tools 34 is registered in the host processing list 36 in receiving order of the operational information.

Figure 4:
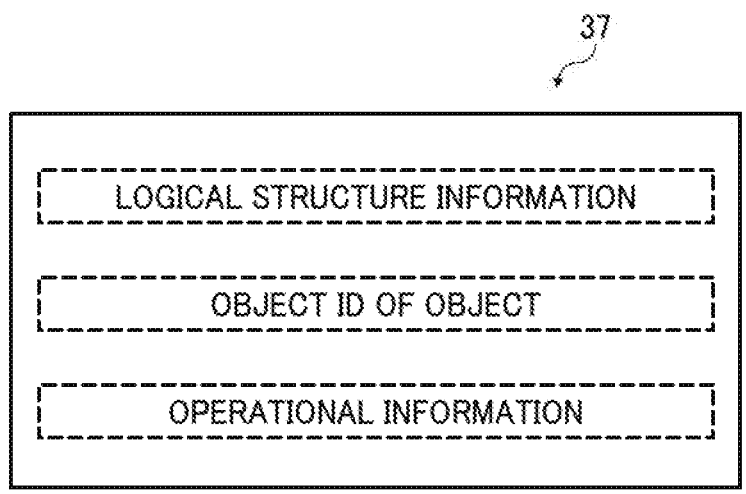
FIG. 4 is a schematic diagram illustrating an exemplary data structure of processing information.

FIG. 4 is a schematic diagram illustrating an exemplary data structure of processing information 37. The processing information 37 includes operational information, identifying information of an object 52 subjected to operation of operational content indicating the operational information (hereinafter referred to as an object ID), and logical structure information of a display image 50 displayed by the operation.

The logical structure information is information indicating a logical structure related to the object 52 included in the display image 50. The logical structure information includes: editing state information indicating a current editing state of each object 52 included in the display image 50 displayed by the operation; identifying information of the object corresponding to the operational content indicating the operational information of the operation; and identifying information of a guest tool 34 used to operate the operational content.

The editing state information includes: positional information in the display image 50 for each object 52 included in the display image 50; the identifying information of the guest tool 34 used to operate the operational content indicating the operational information; and editing content (a color, a shape, a pattern, and the like) applied to the objects 52.

Specifically, the logical structure information sets a master node that is a top of a tree structure as a base and indicates each newly-created object 52 as a slave node relative to the master node. This logical structure information is the information to indicate current editing state information (a position, a shape, a color, and the like) of each object 52, namely, the slave node.

Figure 5:
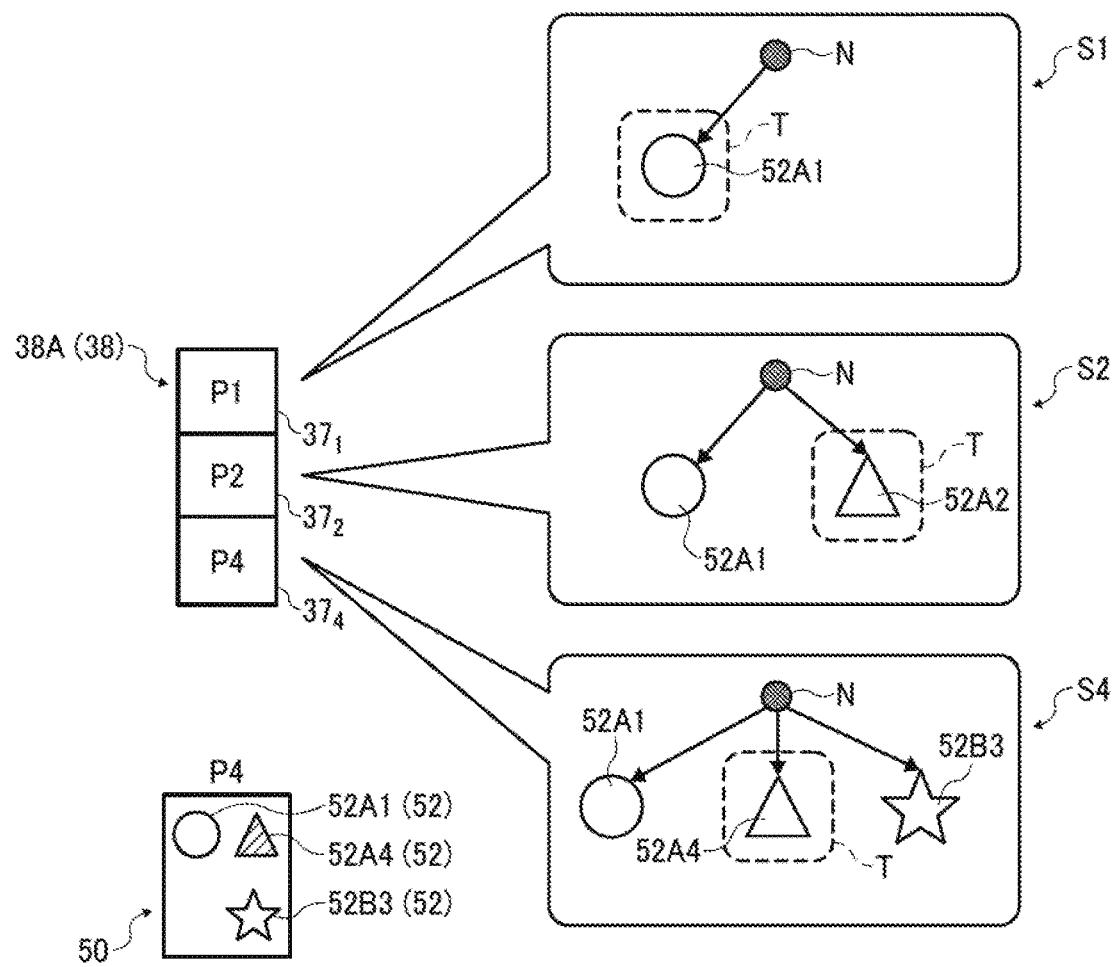
FIG. 5 is an explanatory diagram illustrating an example of logical structure information included in the processing information.

FIG. 5 is an explanatory diagram illustrating an example of the logical structure information included in the processing information 37. As illustrated in FIG. 5, assume that processing information $37_1$, processing information $37_2$, and processing information $37_4$ respectively including operational information of "operation 1 ("P1")," "operation 2 ("P2")", and "operation 4 ("P4")" are registered in the processing list 38A corresponding to the guest tool A.

Then, assume that a round object 52A1 is created by using the guest tool A in the first "operation 1 ("P1")". Then, assume that a triangular object 52A2 is created by using the guest tool A in the second "operation 2 ("P2")". Additionally, assume that a star-shaped object 52B3 is created by using the guest tool B in the third "operation 3 ("P3")". Furthermore, assume that a color of the object 52A2 is changed by using the guest tool A in the fourth "operation 4 ("P4")" to obtain an object 52A4.

In this case, logical structure information S1, logical structure information S2, and logical structure information S3 respectively included in the processing information $37_1$, processing information $37_2$, and processing information $37_4$ are expressed by, for example, tree structures illustrated in FIG. 5. The processing information $37_1$, $37_2$, and $37_4$ respectively include the operational information of the "operation 1 ("P1")", "operation 2 ("P2")", and "operation 4 ("P4")" in the processing list 38A corresponding to the guest tool A.

Specifically, the logical structure information S1 is expressed by the tree structure in which a master node N that is a top of the tree structure is set as a base and the round object 52A1 is set as a slave node relative to the master node N. Additionally, the logical structure information S1 includes information indicating current editing state information of the round object 52A1 that is the slave node (for example, information indicating that a round object is created by using the guest tool A, and other information such as a position, a shape, and a color of the round object 52A1).

Furthermore, the logical structure information S1 includes specifying information T including identifying information of the object 52 corresponding to operational content indicating operational information included in the corresponding processing information $37_1$, and identifying information of the guest tool 34 used to operate the operational content. In the example illustrated in FIG. 5, the logical structure information S1 includes, as the specifying information T, identifying information of the round object 52A1 and identifying information of the guest tool A used to operate the operational content for the object 52A1 indicated in the processing information $37_1$.

The logical structure information S2 is expressed by the tree structure in which a master node N that is a top of the tree structure is set as a base, and the round object 52A1 and the triangular object 52A2 are set as slave nodes relative to the master node N. Additionally, the logical structure information S2 includes: the current editing state information of the round object 52A1 that is the slave node; and current editing state information of the triangular object 52A2 that is the slave node (for example, information indicating a fact that the triangular object is created by using the guest tool A and other information such as a position, a shape, and a color of the triangular object 52A2).

Furthermore, the logical structure information S2 includes specifying information T including identifying information of the object 52 corresponding to operational content indicating operational information included in the corresponding processing information $37_2$, and identifying information of the guest tool 34 used to operate the operational content. In the example illustrated in FIG. 5, the logical structure information S2 includes, as the specifying information T, identifying information of the triangular object 52A2 and identifying information of the guest tool A used to operate the operational content for the object 52A2 indicated in the processing information $37_2$.

The logical structure information S4 of the display image 50 included in the processing information of the "operation 4 ("P4")" is expressed by the tree structure in which a master node N that is a top of the tree structure is set as a base and the round object 52A1, a triangular object 52A4, and a star-shaped object 52B3 are set as slave nodes relative to the master node N. Additionally, the logical structure information S4 includes the current editing state information of the slave nodes, namely, current editing state information of the round object 52A1, current editing state information of the triangular object 52A4, and current editing state information of the star-shaped object 52B3 (for example, information indicating a fact that the star-shaped object created by using the guest tool B and other information such as a position, a shape, and a color of the triangular object 52B3).

Furthermore, the logical structure information S4 includes specifying information T including identifying information of the object 52 corresponding to operational content indicating operational information included in the corresponding processing information 37₄, and identifying information of the guest tool 34 used to operate the operational content. In the example illustrated in FIG. 5, the logical structure information S4 includes, as the specifying information T, identifying information of the triangular object 52A4 and identifying information of the guest tool A used to operate the operational content for the object 52A4 indicated in the processing information 37₄.

Referring back to FIG. 1, the description will be continued. Every time the reception unit 22 receives operational information, the registration unit 26 registers, in the processing list 38 corresponding to the guest tool 34 determined by the determination unit 25, processing information 37 including the received operational information in receiving order of the operational information.

Additionally, in the case where it is determined that the host tool 32 is used, the registration unit 26 registers the processing information 37 including the received operational information in the host processing list 36. Furthermore, in the case where it is determined that any one of the guest tools 34 is used, the registration unit 26 registers the processing information 37 including the received operational information in each of the host processing list 36 and the processing list 38 corresponding to the guest tool 34 determined by the determination unit 25.

Therefore, every time operational information is received, processing information 37 of operational content performed by using any one of the guest tools 34 corresponding to each of the processing lists 38 is sequentially registered in each of the processing lists 38 (processing list 38A and processing list 38B). On the other hand, every time operational information is received, processing information 37 of operational content performed by respectively using the host tool 32 and one of the guest tools 34 is sequentially registered in the host processing list 36.

The arrangement unit 27 arranges a pointer P indicating a current position in each of the host processing list 36 and the processing list 38. Particularly, as illustrated in FIG. 3, the pointer P is arranged at one of processing information registered in each of the host processing list 36 and the processing list 38 for each of the host processing list 36 and the processing list 38.

Every time the reception unit 22 receives operational information, the arrangement unit 27 arranges the pointer P adapted to point the current position at processing information 37 including latest received operational information in each of the host processing list 36 and the processing list 38. Therefore, the processing information 37 at which the pointer P is arranged indicates the processing information 37 corresponding to a current processing state.

Therefore, every time new operational information is received via the guest tool bar 44A or the guest tool bar 44B in accordance with operation by a user at the operation unit 12, the position of the pointer P in corresponding processing list 38 is arranged at a position corresponding to processing information 37 of the input (received) operational information.

Additionally, in the case where the reception unit 22 receives undo operation, the arrangement unit 27 arranges, at a position returned toward a previous position from a current position, the position of the pointer P currently arranged in a processing list 38 (processing list 38A or processing list 38B) corresponding to a guest tool 34 (guest tool A or guest tool B) used for the undo operation. In the present embodiment, every time one-time undo operation is received, the arrangement unit 27 arranges the position of the pointer P at a position returned one time before toward a previous position from a current position.

On the other hand, in the case where the reception unit 22 receives redo operation, the arrangement unit 27 arranges, at a position advanced from a. current position, the position of the pointer P currently arranged in the processing list 38 (processing list 38A or processing list 38B) corresponding to the guest tool 34 (guest tool A or guest tool B) used for the redo operation. In the present embodiment, every time one-time redo operation is received, the arrangement unit 27 arranges the position of the pointer P at the position one time advanced from a current position.

The reception unit 22 may further receive undo operation by a user via the host tool 32. In this case, the arrangement unit 27 arranges the position of the pointer P currently arranged in the host processing list 36 at a position returned toward a previous position from a current position. In the present embodiment, every time one-time undo operation is received, the arrangement unit 27 arranges the position of the pointer P at a position returned one time before toward the previous position from the current position.

Incidentally, in this case, the registration unit 26 updates the processing list 38 (processing list 38A or processing list 38B) corresponding to one of the guest tools 34 used to operate the operational content indicating the operational information included in processing information 37 based on the processing information 37. The processing information 37 is located in the host processing list 36 and bus the pointer P arranged at the position returned by the arrangement unit 27. At this point, the registration unit 26 also updates the position of the pointer P in the processing list 38.

Additionally, the reception unit 22 may further receive redo operation by a user via the host tool 32. In this case, the arrangement unit 27 arranges a position of the pointer P currently arranged in the host processing list 36 at a position advanced from a current position. In the present embodiment, every time one-time redo operation is received, the arrangement unit 27 arranges the position of the pointer P at the position one time advanced from the current position.

Incidentally, in this case, the registration unit 26 updates the processing list 38 (processing list 38A or processing list 38B) corresponding to one of the guest tools 34 used to operate the operational content indicating the operational information included in processing information 37 based on the processing information 37. The processing information 37 is located in the host processing list 36 and has the pointer P arranged at the position advanced by the arrangement unit 27. At this point, the registration unit 26 also updates the position of the pointer P in the processing list 38.

The display controller 28 displays a display image 50. In the present embodiment, the display controller 28 displays a display image 50 in the drawing area 48 of the operation screen 40.

Particularly, the display controller 28 displays, in the drawing area 48 of the operation screen 40, the display image 50 including each of objects 52 sequentially subjected to editing processing in accordance with each of the processing information 37. The processing information 37 located in each of the processing lists 38 (processing list 38A and processing list 38B) corresponding to each of the plurality of guest tools 34 (guest tool A and guest tool B) includes processing information from first-registered processing information 37 to processing information 37 having the pointer P currently arranged.

For example, the display controller 28 displays a display image 50 based on logical structure information included in processing information 37 located in each of the processing lists 38 (processing list 38A and processing list 38B) corresponding to each of the plurality of guest tools 34 and having the pointer P currently arranged. Consequently, the display controller 28 displays, in the drawing area 48, the display image 50 including the objects 52 sequentially subjected to the editing processing. In other words, the display controller 28 generates the display image 50 and displays this display image 50 on the operation screen 40 by arranging the objects 52 included in the logical structure information so as to achieve a current editing state based on current editing state information of each of the object 52 included in the logical structure information.

FIGS. 6A to 6H (FIG. 6) are an explanatory diagram illustrating an exemplary flow of image processing using the image processing apparatus 10 of the present embodiment.

Figure 6B:
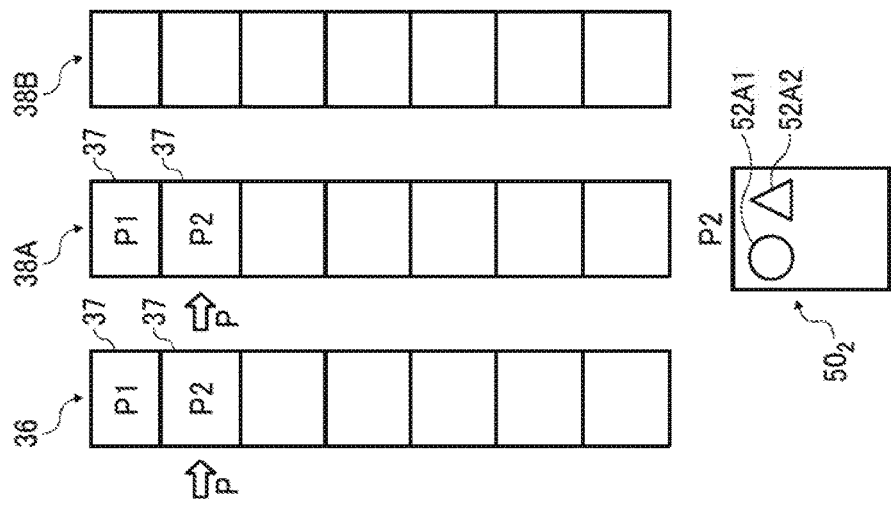
FIGS. 6A to 6H (FIG. 6) are an explanatory diagram illustrating an exemplary flow of image processing.
Figure 6A:
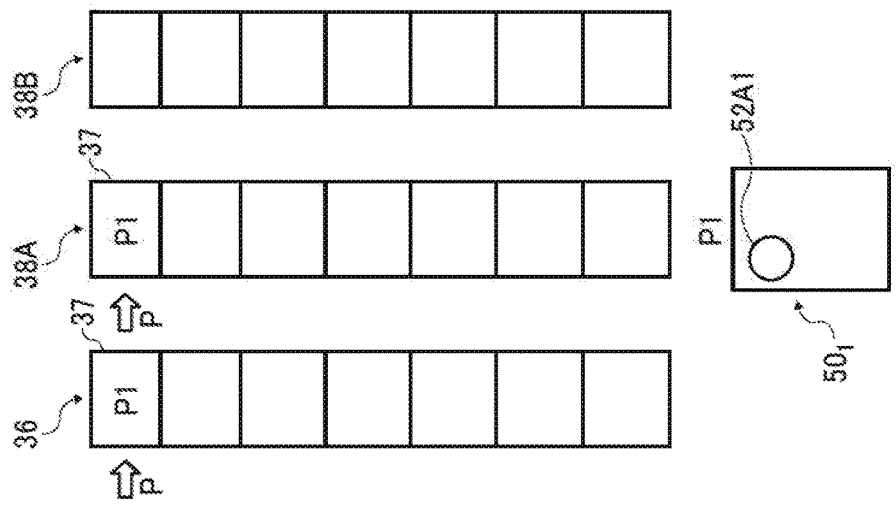

For example, as illustrated in FIG. 6A, assume that a round object 52A1 is drawn by using the guest tool A in accordance with operation of first "operation 1 ("P1")" by a user. Then, the reception unit 22 receives operational information including identifying information of the guest tool A, a used extended function, and operated content (here, creation of the round object 52A1). In this case, the registration unit 26 registers processing information 37 including the operational information of the "operation 1 ("P1")" in the host processing list 36 and the processing list 38A of the guest tool A. Additionally, the arrangement unit 27 arranges the pointer P at the processing information 37 of the "operation 1 ("P1")" in each of the host processing list 36 and the processing list 38A. In this case, the display controller 28 displays a display image $50_1$ including the round object 52A1 subjected to the editing processing in accordance with the operational information included in the processing information 37 of the "operation 1 ("P1")".

Next, as illustrated in FIG. 6B, assume that a triangular object 52A2 is drawn by using the guest tool A in accordance with operation of second "operation 2 ("P2")" by the user. Then, the reception unit 22 receives operational information including the identifying information of the guest tool A, a used extended function, and operated content (here, creation of the triangular object 52A2). In this case, the registration unit 26 registers, at the tail end in each of host processing list 36 and the processing list 38A of the guest tool A, processing information 37 including the operational information of the "operation 2 ("P2")". Additionally, the arrangement unit 27 arranges the pointer P at the processing information 37 of the "operation 2 ("P2")" in each of the host processing list 36 and the processing list 38A.

In this case, the display controller 28 displays a display image $50_2$ including the round object 52A1 and the triangular object 52A2 sequentially subjected to the editing processing in accordance with the operational information included in the processing information 37 in each of the "operation 1 ("P1")" and the "operation 2 ("P3")".

Figure 6C:
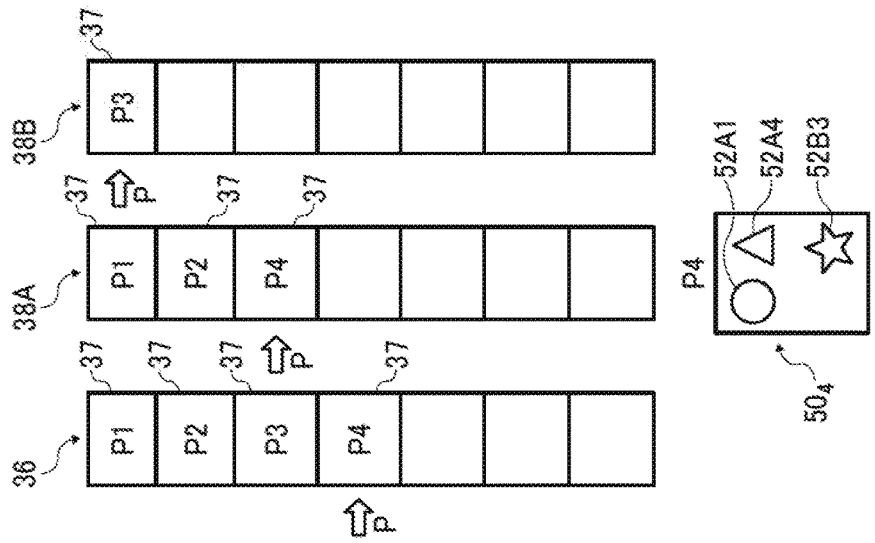

Next, as illustrated in FIG. 6C, assume that a star-shaped object 52B3 is drawn by using the guest tool B in accordance with operation of third "operation 3 ("P3")" by the user. Then, the reception unit 22 receives operational information including identifying information of the guest tool B, a used extended function, and operated content (here, creation of the star-shaped object 52B3). In this case, the registration unit 26 registers, at the tail end in each of host processing list 36 and the processing list 38B of the guest tool B, processing information including the operational information of the "operation 3 ("P3")". Additionally, the arrangement unit 27 arranges the pointer P at the processing information 37 of the "operation 3 ("P3")" in each of the host processing list 36 and the processing list 38B.

In this case, the display controller 28 displays a display image $50_3$ including: the round object 52A1 and the triangular object 52A2 sequentially subjected to the editing processing in accordance with the operational information included in the processing information 37 in each of the "operation 1 ("P1")" and the "operation 2 ("P2")" in the processing list 38A; and the star-shaped object 52B3 subjected to the editing processing in accordance with the operational information included in the processing information 37 of the "operation 3 ("P3")" in the processing list 38B.

Figure 6D:
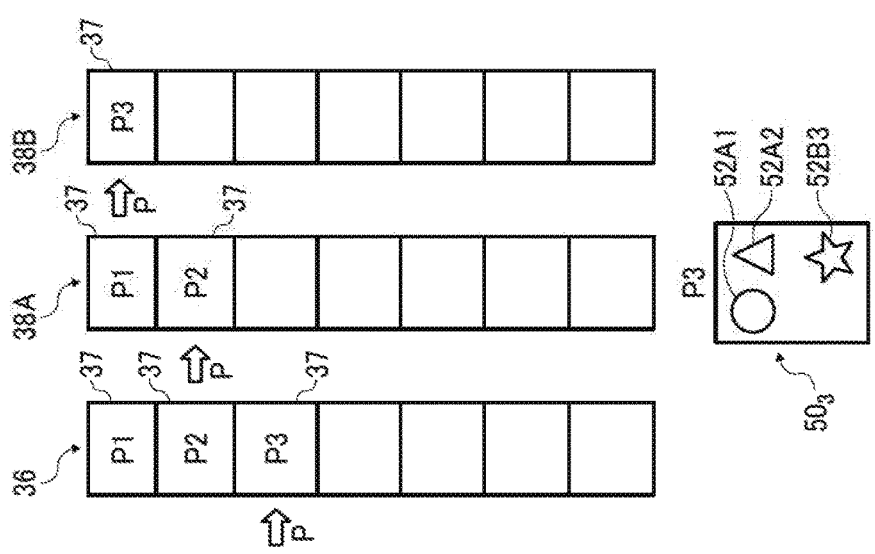

Next, as illustrated in FIG. 6D, assume that operation to change a color of the triangular object 52A2 and create an object 52A4 is performed by using the guest tool A in accordance with operation of fourth "operation 4 ("P4")" by the user. Then, the reception unit 22 receives operational information including the identifying information of the guest tool A, a used extended function, and operated content (here, color change of the object 52A2 to create the object 52A4). In this case, the registration unit 26 registers processing information 37 including the operational information of the "operation 4 ("P4")" in the host processing list 36 and the processing list 38A of the guest tool A. Additionally, the arrangement unit 27 arranges the pointer P at the processing information 37 of the "operation 4 ("P4")" in each of the host processing list 36 and the processing list 38A.

In this case, the display controller 28 displays a display image $50_4$ including: the round object 52A1 and the triangular object 52A4 having the color changed sequentially subjected to the editing processing in accordance with the operational information included in the processing information 37 of the "operation 1 ("P1")", "operation 2 ("P2")", and "operation 4 ("P4")" in the processing list 38A; and the star-shaped object 52B3 subjected to the editing processing in accordance with the operational information included in the processing information 37 of the "operation 3 ("P3")" in the processing list 38B.

Figure 6E:
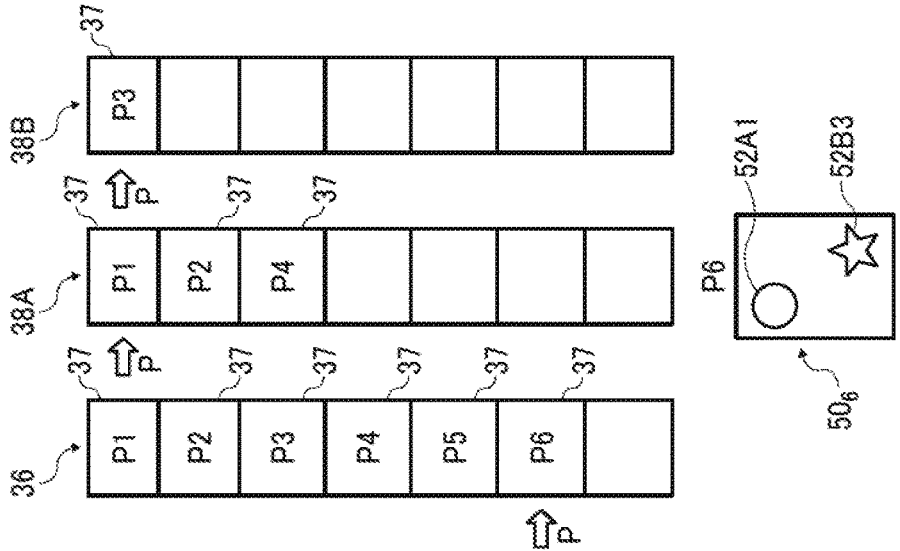

Next, as illustrated in FIG. 6E, assume that an operation command for undo function is provided in accordance with operation at the guest tool bar 44A by the user. In this case, for example, the reception unit 22 receives the identifying information of the guest tool A used for the operation and information indicating the undo operation in accordance with operation of "operation 5 ("P5")" by the user. Then, the registration unit 26 arranges the position of the pointer P currently arranged in the processing list 38A corresponding to the guest tool A at a previous position returned one time before from the current position. Therefore, the position of the pointer P in the processing list 38A is moved from the position indicating the processing information 37 of the "operation 4 ("P4")" to the position indicating the processing information 37 of the "operation 2" that is the processing information 37 one time before. On the other hand, the position of the pointer P in the processing list 38B is not changed.

Additionally, in this, case, the registration unit 26 registers, in the host processing list 36, the processing information 37 received in accordance with operation of "operation 5 ("P5")". The processing, information includes; the identifying information of the guest tool A used for the operation; information indicating the undo operation; and logical structure information. Furthermore, the arrangement unit 27 arranges the pointer P at the processing information of the "operation 5 ("P5")" in the host processing list 36 (in other words, moves the pointer P).

In this case, the display controller 28 displays a display image $50_5$ including: the round object 52A1 and the triangular object 52A2 before color change sequentially subjected to the editing processing in accordance with the operational information included in the processing information 37 in each of the "operation 1 ("P1")" and the "operation 2 ("P2")" in the processing list 38A; and the star-shaped object 52B3 subjected to the editing processing in accordance with the operational information included in the processing information 37 of the "operation 3 ("P3")" in the processing list 38B.

Figure 6F:
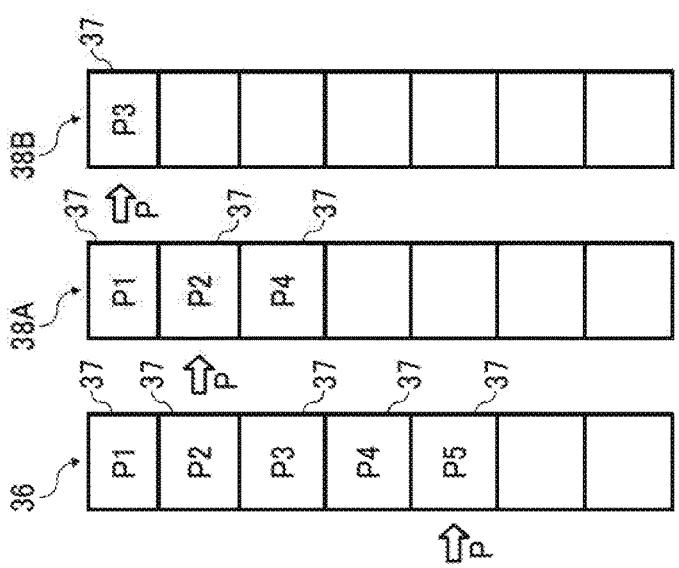

Next, as illustrated in FIG. 6F, assume that an operation command for undo function is provided in accordance with operation at the guest tool bar 44A by the user. In this case, for example, the reception unit 22 receives the identifying information of the guest tool A used for the operation in accordance with operation of "operation 6 ("P6")" by the user, and information indicating the undo operation. Then, the registration unit 26 arranges the position of the pointer P currently arranged in the processing list 38A corresponding to the guest tool A at a position returned one time before from the current position. Therefore, the position of the pointer P in the processing list 38A is moved from the position indicating the processing information 37 of the "operation 2 ("P2")" to the position indicating the processing information 37 of the "operation 1 ("P1")" that is the processing information 37 one time before. On the other hand, the position of the pointer P in the processing list 38B is not changed.

Additionally, in this case, the registration unit 26 registers, in the host processing list 36, the processing information 37 received in accordance with operation of "operation 6 ("P6")". The processing information 37 includes: the identifying information of the guest tool A used for the operation; information indicating the undo operation: and logical structure information. Furthermore, the arrangement unit 27 arranges the pointer P at the processing information of the "operation 6 ("P6")" in the host processing list 36 (in other words, moves the pointer P).

In this case, the display controller 28 displays a display image 50$_6$ including: the round object 52A1 subjected to the editing processing in accordance with the operational information included in the processing information 37 of the "operation 1 ("P1")" in the processing list 38A: and the star-shaped object 52B3 subjected to the editing processing in accordance with the operational information included in the processing information 37 of the "operation 3 ("P3")" in the processing list 38B.

Figure 6G:
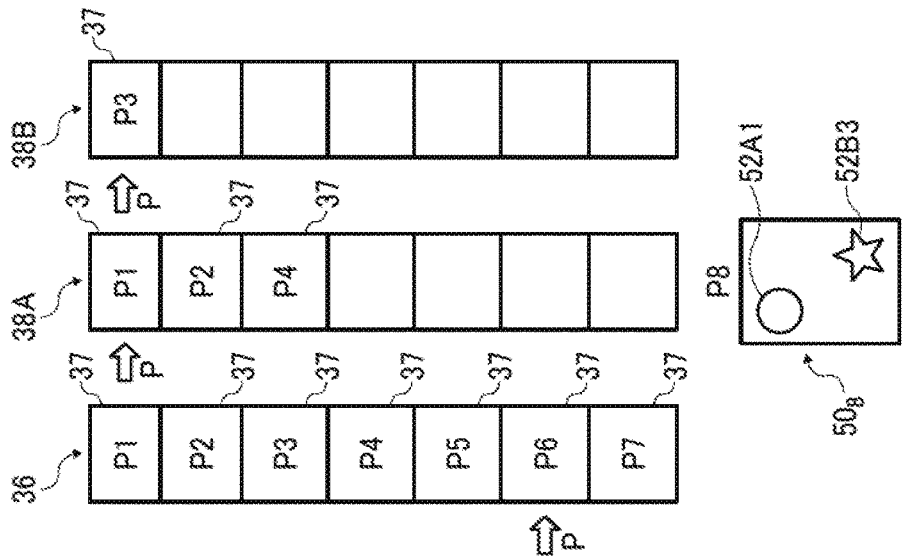

Next, as illustrated in FIG. 6G, assume that an object 52A7 having an inverted triangle shape is drawn by using the guest tool A in accordance with operation of seventh "operation 7 ("P7")" by the user. Then, the reception unit 22 receives operational information including: the identifying information of the guest tool A, a used extended function, and operated content (here, creation of the object 52A7 having the inverted triangle shape). In this case, the registration unit 26 registers, at the tail end of host processing list 36, processing information 37 including the operational information of "operation 7 ("P7")". Additionally, the registration unit 26 deletes each of the processing information 37 (processing information 37 in each of the "operation 2 ("P2")" and "operation 4 ("P4")" (refer to FIG. 6F) registered after the processing information 37 indicating the "operation 1 ("P1")" at which the pointer P is currently positioned in the processing list 38A. Then, the registration unit 26 registers the processing information 37 including the operational information of the "operation 7 ("P7")" at the tail end (refer to FIG. 6G). Furthermore, the arrangement unit 27 arranges the pointer P at the processing information 37 of the "operation 7 ("P7")" in each of the host processing list 36 and the processing list 38A.

In this case, the display controller 28 displays a display image 50$_7$ including the round-shape object 52A1 and the object 52A7 having the inverted triangle shape sequentially subjected to the editing processing in accordance with the operational information included in the processing information 37 in each of the "operation 1 ("P1")" and the "operation 7 ("P7")" in the processing list 38A; and the star-shaped object 52B3 subjected to the editing processing in accordance with the operational information included in the processing information 37 of the "operation 3 ("P3")" in the processing list 38B.

Figure 6H:
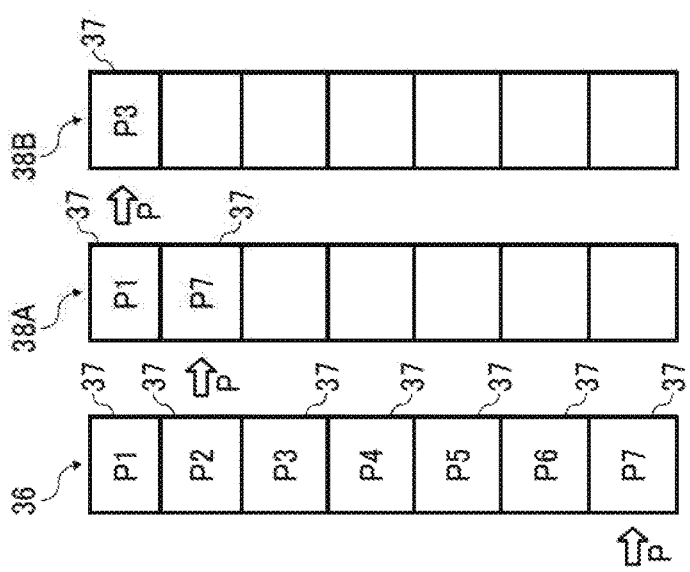

Next, as illustrated in FIG. 6H, assume that an operation command for undo function is provided by operation of the host tool bar 42 by the user. In this case, for example, the reception unit 22 receives identifying information of the host tool 32 used for the operation in accordance with operation by the user, and the information indicating the undo operation. Then, the registration unit 26 arranges the position of the pointer P currently arranged in the host processing list 36 at a previous position returned one time before from the current position, Therefore, the position of the pointer P in the host processing list 36 is moved from the position indicating the processing information 37 of the "operation 7 ("P7")" to the position indicating the processing information 37 of the "operation 6 ("P6")" that is the processing information 37 one time before. On the other hand, the position of the painter P in the processing, list 38B is not changed.

Additionally, in this case, the registration unit 26 updates the processing list 38A based on the processing information 37 of the "operation 6 ("P6")" indicated by the pointer P in the host processing list 36. Specifically, the registration unit 26 updates the processing list 38A so as to achieve an editing state indicated by the "operation 6 ("P6")" by using logical structure information included in the processing information 37 of the "operation 6 ("P6")". At this point, the registration unit 26 also updates the position of the pointer P. Therefore, as illustrated in FIG. 6H, the processing list 38A is updated such that the processing information 37 in each of the "operation 1 ("P1")", "operation 2 ("P2")", and "operation 4 ("P4")" is registered in this order and the pointer P is arranged at the position indicating the processing information 37 of the "operation 1 ("P1")".

In this case, the display controller 28 displays a display image 50$_8$ including the round-shape object 52A1 subjected to the editing processing in accordance with the operational information included in the processing information 37 of the "operation 1 ("P1")" in the processing list 38A; and the star-shaped object 52B3 subjected to the editing processing in accordance with the operational information included in the processing information 37 of the "operation 3 ("P3")" in the processing list 38B.

Thus, in the present embodiment, the processing list 38 is controlled per the guest tool 34, and the display image 50 is displayed by using the processing list 38. Therefore, work efficiency at the time of image editing can be improved.

Here, logical structure information of a display image 50 may be controlled by each of the guest tools 34 in order to execute undo operation or redo operation only for an object 52 created/edited by using one guest tool 34 (e.g., guest tool) out of the plurality of guest tools 34 (guest tool A and guest tool B).

As described above, each of the processing information 37 corresponding to each operation included in the processing list 38 includes the logical structure information of the display image 50. Therefore, using such logical structure information, the image processing apparatus 10 can execute the undo operation or the redo operation only for the object 52 created/edited by using the one guest tool 34 (e.g., guest tool A) out of the plurality of guest tools 34 (guest tool A and guest tool 11).

On the other hand, in the related art, editing processing indicating an operation command executed via one guest tool may influence editing processing having executed via another guest tool. Therefore, in the related art, the user may need to provide various kinds of operation commands in order to perform intended image editing.

Figure 7A:
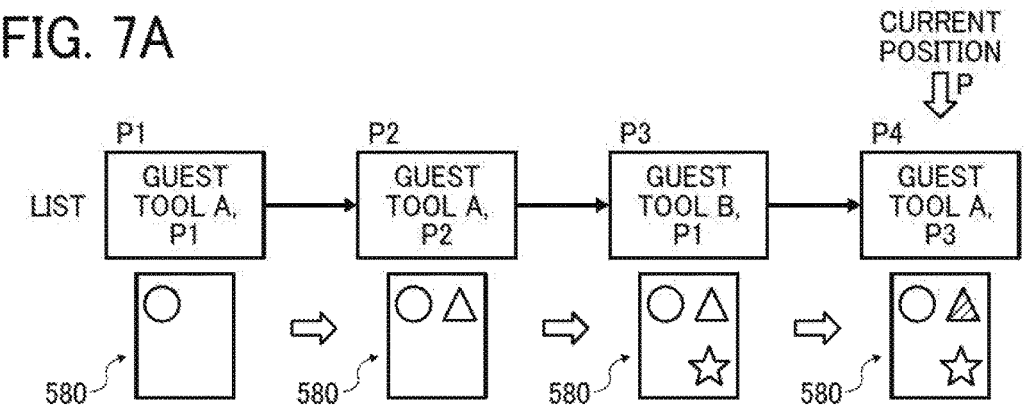
FIGS. 7A to 7C (FIG. 7) are an explanatory diagram of a comparative example.
Figure 7B:
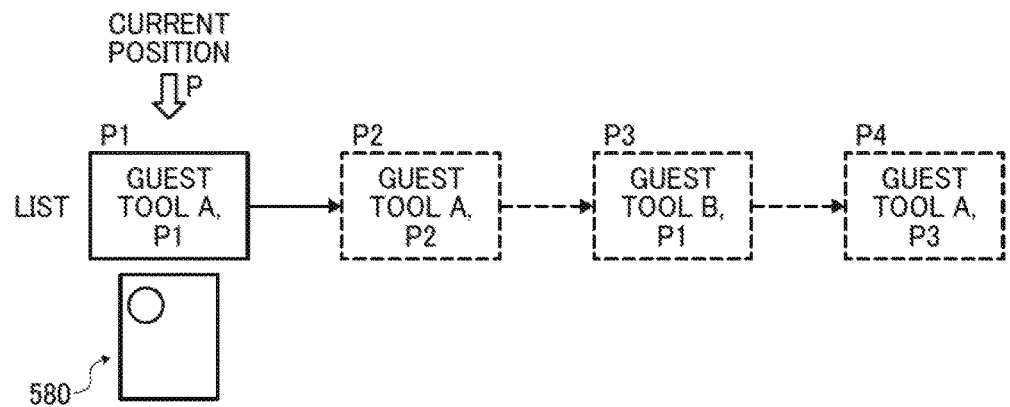
Figure 7C:
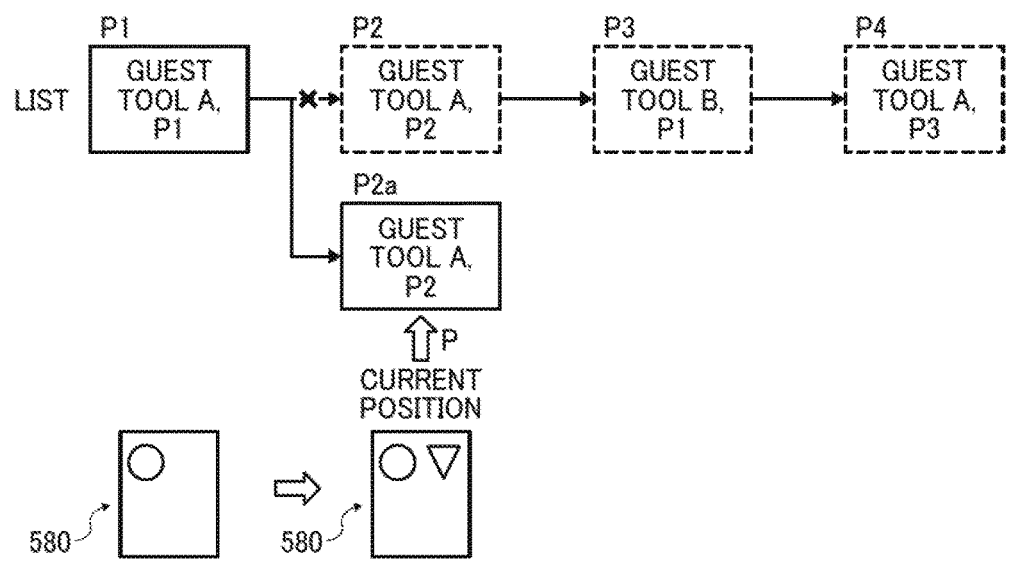

FIGS. 7A to 7C (FIG. 7) are an exemplary diagram of a comparative example in which information indicating operation commands performed by the plurality of guest tools 34 is controlled by one list. In this case, following inconveniences may occur.

Specifically, FIG. 7A is a diagram illustrating an exemplary state of the list in the case of operating the guest tool A and the guest tool B in a switching manner. As illustrated in FIG. 7A, assume that "operation 1 ("P1")" to "operation 4 ("P4")" are sequentially performed to sequentially perform drawing of a round object by using the guest tool A, drawing of a triangular object by using the guest tool A, drawing of a star-shaped object by using the guest tool B, and change of a color of the triangular object by using the guest tool A. In this case, a pointer P points the "operation 4 ("P4")".

FIG. 7B is a diagram illustrating a state of performing undo operation from the "operation 4 ("P4")" to the "operation 1 ("P1")" in accordance with an operation command by a user. As illustrated in FIG. 7B, in the case of performing the undo operation back to the "operation 1 ("P1")", the undo operation is executed also for the star-shaped object drawn by the guest tool B, and the star-shaped object is not displayed.

FIG. 7C is a diagram illustrating an exemplary state of the list in the case where new operation is further performed by using the guest tool A in accordance with an operation command by the user. As illustrated in FIG. 7C, assume that an object having an inverted triangle shape is drawn by executing the new "operation 2 ("P2a")" by using the guest tool A from the state illustrated in FIG. 7B. In this case, information already registered in the list and indicating operation before the undo operation (here information of "operation 2 ("P2")" to "operation 4 ("P4")" such as information of "operation 3 ("P3")") is deleted.

Thus, in the comparative example, in the case of operating the guest tool A and the guest tool B in a switching manner, the undo operation is also applied to information corresponding to operation of the guest tool B even though the undo operation is intended to be applied only to the processing information corresponding to operation of the guest tool A. Therefore, the object drawn by using the guest tool B (here, the star-shaped object) is erased.

Therefore, the user may need to perform operation by using the guest tool B again in order to draw the star-shaped object again. In other words, according to the system of the comparative example, work efficiency is degraded in the case of performing image editing by using the plurality of guest tools.

On the other hand, in the image processing apparatus 10 of the present embodiment, a processing list 38 is controlled for each of the guest tools 34. Additionally, each of the processing information 37 corresponding to each operation included in the processing list 38 includes logical structure information of a display image 50.

Therefore, as described by using FIG. 6, work efficiency can be improved in the case of performing image editing by using the plurality of guest tools 34.

Specifically, as described by using FIG. 6, assume that the undo operation is performed by using the guest tool A (refer to FIG. 6E) and then again the undo operation is further performed (refer to FIG. 6F) when the display image $50_4$ of the "operation 4 ("P4")" illustrated in FIG. 6D is displayed by using the image processing apparatus 10 of the present embodiment. In such a case, the undo operation may be effective only for the operated guest tool A and the undo operation may not be applied to the non-operated guest tool B in the image processing apparatus 10 of the present embodiment. Therefore, in the case where the undo operation is performed by using the guest tool A as illustrated in FIGS. 6E and 6F, the star-shaped object 52B3 created/edited by using the guest tool B is not erased and remains in the display image 50.

Consequently, in the image processing apparatus 10 of the present embodiment, work efficiency can be improved in the case of performing image editing by using the plurality of guest tools 34.

Figure 8:
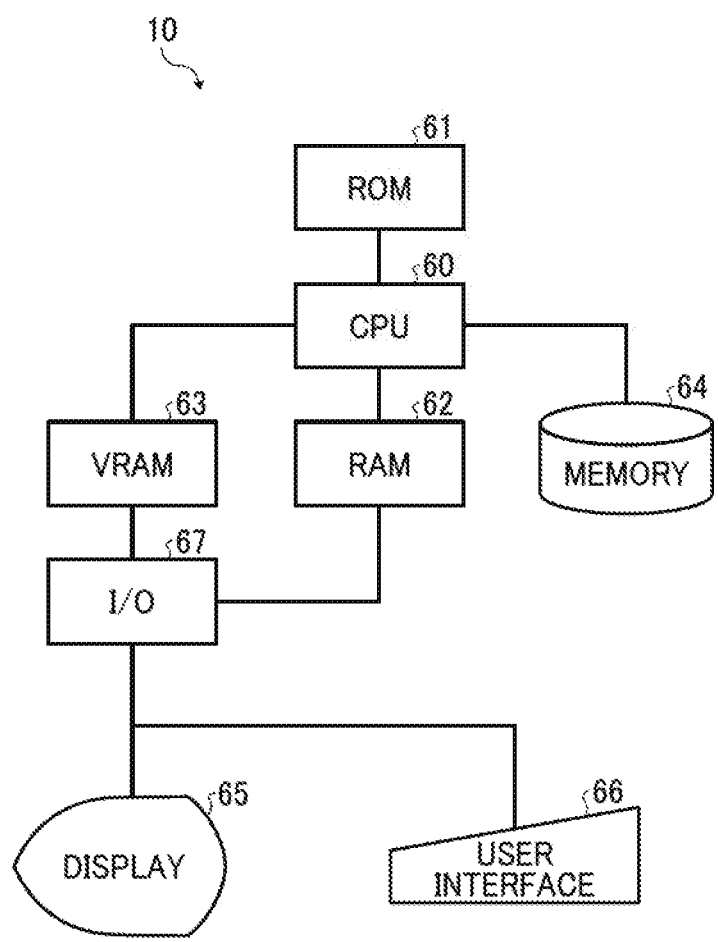
FIG. 8 is an exemplary hardware structure of the image processing apparatus.

Next, a hardware configuration of the image processing apparatus 10 will be described. FIG. 8 is a diagram illustrating an exemplary hardware configuration of the image processing, apparatus 10. The image processing apparatus 10 in this embodiment is implemented by a general-purpose computer. As illustrated in FIG. 8, the image processing apparatus 10 includes a central processing unit (CPU) 60, a read-only memory (ROM) 61, a random access memory (RAM) 62, a memory such as a video RAM (VRAM) 63, a memory 64 such as an HDD, a display 65, a user interface (UI) 66 such as a keyboard and a mouse, and an input-output (I/O) 67 such as an input and output interface.

In the present embodiment, the CPU 60 functions as the above-described data receiving unit 14 and editing unit 20 (reception unit 22, image processor 24 (determination unit 25, registration unit 26, arrangement unit 27, and display controller 28)) by reading and executing, on the RAM 62, a program stored in the ROM 61 and the like. Meanwhile, not limited thereto, at least part of the above-described data receiving unit 14 and editing unit 20 (reception unit 22, image processor 24 (determination unit 25, registration unit 26, arrangement unit 27, and display controller 28)) may be implemented by, for example, a dedicated hardware circuit (e.g., semiconductor integrated circuit or the like). In this example, the above-described operation unit 12 is implemented by the above-described UI 66. The above-described display unit 16 is implemented by the display 65. Additional the above-described storage 18 is implemented by, for example, the memory 64 or the like.

Incidentally, the program executed by the above-described CPU 60 may be provided by being recorded in a recording medium readable by the computer, such as a CD-ROM, a flexible disk (FD), CD-R, and a digital versatile disk (DVD) in a file of an installable format or an executable format.

Furthermore, the program executed by the above-described CPU 60 may also be provided by being stored on a computer coupled to a network such as the Internet, and downloaded via the network. Additionally, a control program executed by the above-described CPU 60 may be provided or distributed via a network such as the Internet.

Figure 9B:
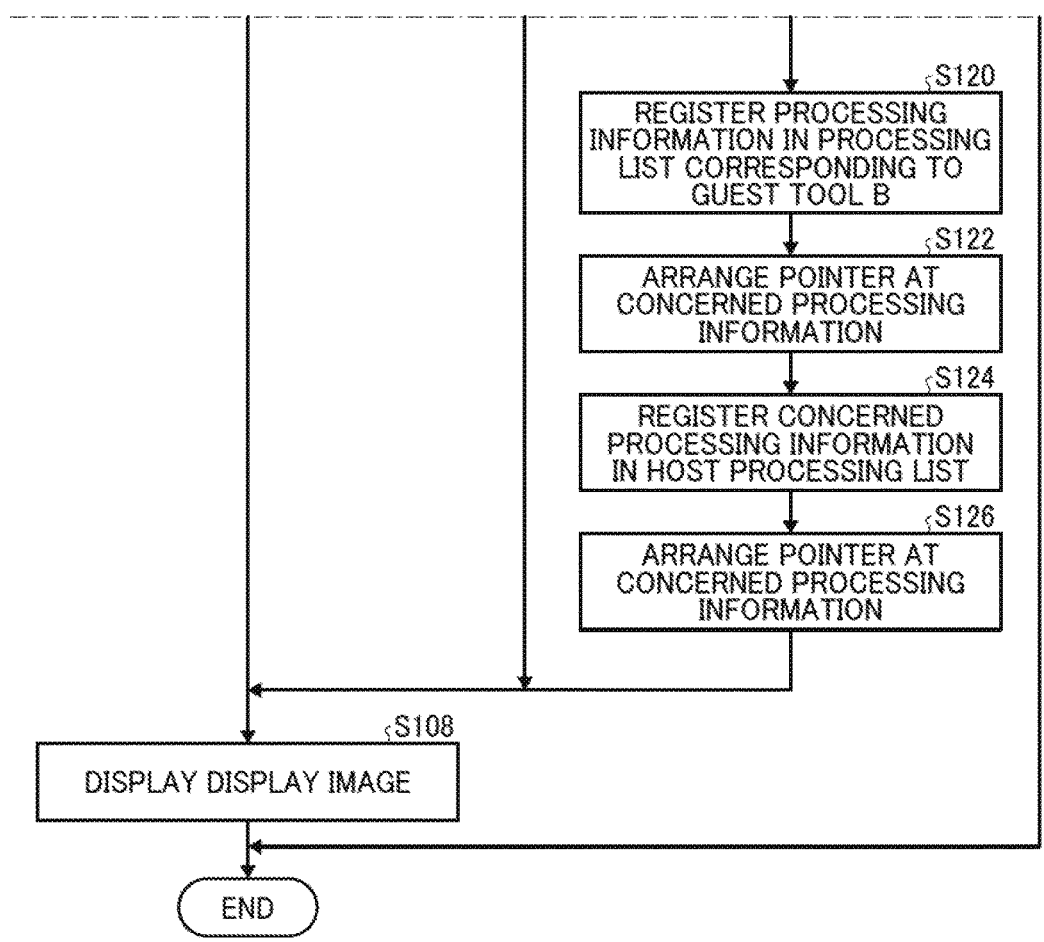

Next, an exemplary procedure of image processing executed by the image processing apparatus 10 will be described. FIG. 9 is a flowchart illustrating the exemplary procedure of image processing executed by the image processing apparatus 10. The operation of FIG. 9 is performed under control of the CPU 60.

First, it is determined whether the reception unit 22 receives operational information (step S100). In the case of negative determination in step S100 (step S100: No), the processing ends. In the case of positive determination in step S100 (step S100: Yes), the processing proceeds to step S102.

In step S102, the determination unit 25 determines whether the host tool 32 is used and whether any one of the guest tools 34 is used to operate operational content indicating the operational information received in step S100 (step S102).

In the case of determining that the host tool 32 is used (step S102: Yes), the processing proceeds to step S104. In step S104, the registration unit 26 registers, at the tail end of the host processing list 36, processing information 37 including the operational information received in step S100 (step S104). Next, the arrangement unit 27 arranges a pointer P at the processing information 37 located in the host processing list 36 and registered in step S104 (step S106). Then, the processing proceeds to later-described step S108.

On the other hand, in the case of determining in step S102 that any one of the guest tools 34 is used (step S102: No), the processing proceeds to step S110.

In step S110, the determination unit 25 determines which one of the guest tools 34 is used to operate operational content indicating the operational information received in step S100 (step S110). In the present embodiment, the determination unit 25 determines which one of the guest tool A and the guest tool B is used.

In the case of determining that the guest tool A is used (step S110: Yes), the processing proceeds to step S112. In step S112, the registration unit 26 registers, at the tail end of a processing list 38A corresponding to the guest tool A, processing information 37 including the operational information received in step S100 (step S112). Next, the arrangement unit 27 arranges the pointer P at the processing information 37 included in the processing list 38A and registered in step S112 (step S114).

Next, the registration unit 26 registers, at the tail end of a host processing list 36 corresponding to the host tool 32, the processing information 37 including the operational information received in step S100 (step S116). The processing information 37 registered in step S116 indicates content same as the processing information 37 registered in step S112.

Next, the arrangement unit 27 arranges the pointer P at the processing information 37 located in the host processing list 36 and registered in step S116 (step S118). Then, the processing proceeds to later-described step S108.

On the other hand, in the case where the determination unit 25 determines in step S110 that the guest tool B is used (step S110: No), the processing proceeds to step S120. In step S120, the registration unit 26 registers, at the tail end of a processing list 38B corresponding to the guest tool B, the processing information 37 including the operational information received in step S100 (step S120). Next, the arrangement unit 27 arranges the pointer P at the processing information 37 located in the processing list 38B and registered in step S120 (step S122).

Next, the registration unit 26 registers, at the tail end of the host processing list 36 corresponding to the host tool 32, the processing information 37 including the operational information received in step S100 (step S124). The processing information 37 registered in step S124 indicates content same as the processing information 37 registered in step S120.

Next, the arrangement unit 27 arranges the pointer P at the processing information 37 located in the host processing list 36 and registered in step S124 (step S126). Then, the processing proceeds to later-described step S108.

In step S108, the display controller 28 displays a display image 50 on the operation screen 40 of the display unit 16 based on the respective processing lists 38 (processing list 38A and processing list 38B) corresponding to the plurality of guest tools 34 (guest tool A and guest tool B) (step S108) respectively. For example, the display controller 28 displays the display image 50 based on the logical structure information included in the processing information 37 in which the pointer P is arranged in each of the processing lists 38 (processing list 38A and processing list 38B) corresponding to the plurality of guest tools 34 respectively. In other words, the display controller 28 generates and displays the display image 50 on the operation screen 40 by arranging each of objects 52 included in the logical structure information so as to achieve a current editing state based on current editing state information in each of the objects 52 included in the logical structure information. Then, the processing ends.

Figure 10:
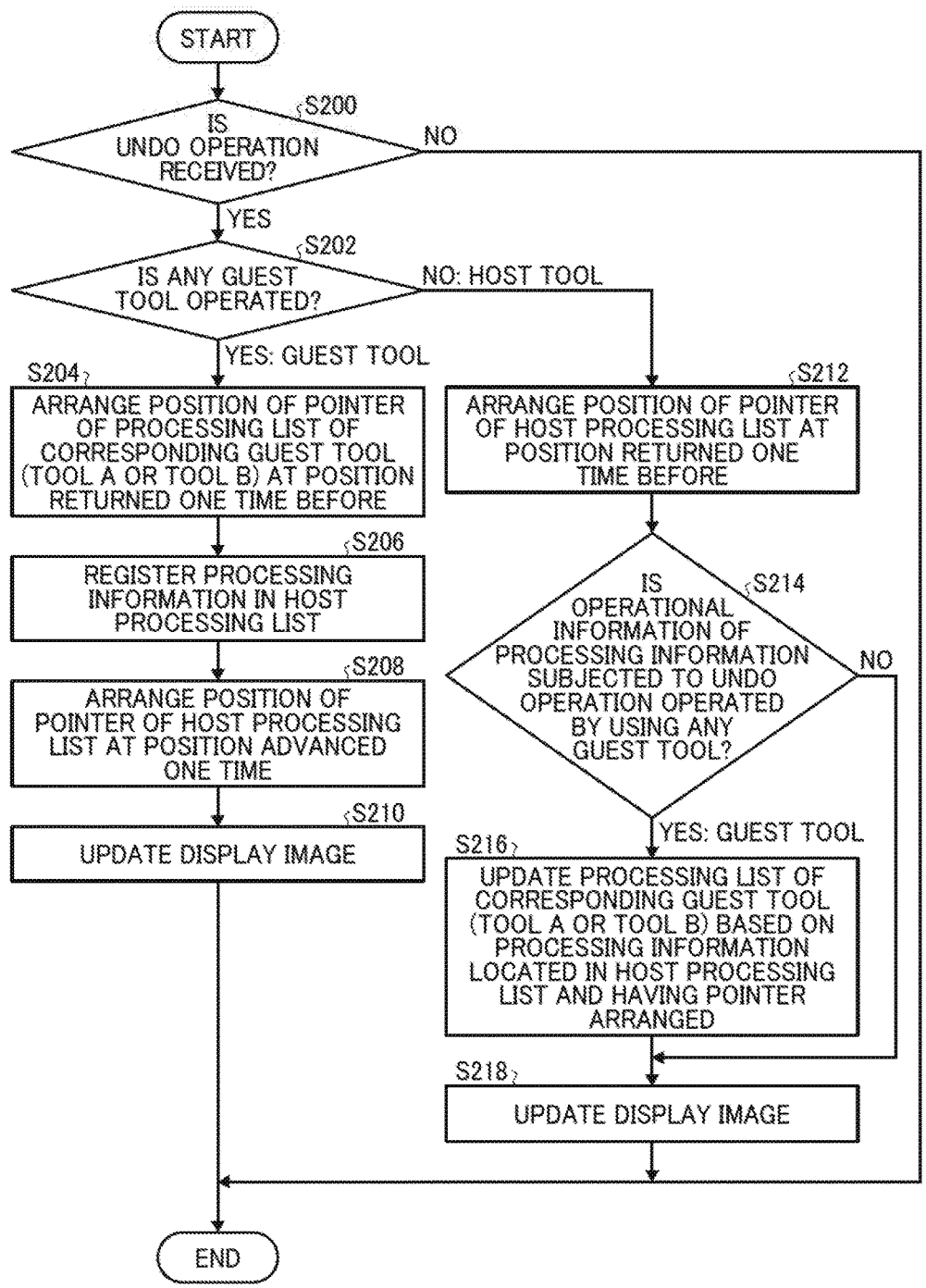
FIG. 10 is a flowchart illustrating an exemplary procedure of interrupt handling in the case of receiving undo operation.

Next, an exemplary procedure of processing an interrupt executed by the image processing apparatus 10 in the image processing illustrated in FIG. 9 will be described. FIG. 10 is a flowchart illustrating an exemplary procedure of processing the interrupt in the case of receiving undo operation. The operation of FIG. 10 is performed under control of the CPU 60.

First, it is determined whether the reception unit 22 receives undo operation (step S200). In the case of negative determination in step S200 (step S200: No), the processing ends. In the case of positive determination in step S200 (step S200: Yes), the processing proceeds to step S202.

Iii step S202, the determination unit 25 determines whether any one of the guest tools 34 is used for the undo operation received in step S200 (step S202). In the case of determining that any one of the guest tools 34 is used (step S202: Yes), the processing proceeds to step S204.

In step S204, the arrangement unit 27 arranges a position of a pointer P currently arranged in a processing list 38 (processing list 38A or processing list 38B) corresponding to the guest tool 34 (guest tool A or guest tool B) used for the undo operation at a position returned one time before toward a previous position from the current position (step S204).

Next, the arrangement unit 27 registers, at the tail end of the host processing list 36, processing information 37 including: identifying information of the guest tool 34 (guest tool A or guest tool B) used for the undo operation; information indicating the undo operation; and logical structure information (step S206). Additionally the arrangement unit 27 arranges, at a position advanced one time, the current position of the pointer P in the host processing, list 36 (step S208). As a result of the processing in step S208, the pointer P is arranged at the position of the processing information 37 located in the host processing list 36 and registered in step S206.

Next, the display controller 28 updates a display image 50 (step S210). In other words, for example, the display controller 28 displays the display image 50 based on the logical structure information included in the processing information 37. The processing information 37 is located in each of the processing lists 38 (processing list 38A and processing list 38B) corresponding to each the plurality of guest tools 34 and has the pointer P arranged. Then, the present routine ends.

Therefore, the display image 50 in which the undo operation may be effected only for the operated guest tool 34

(guest tool A or guest tool B) is displayed. Furthermore, the undo operation is not applied to the display image 50 for a non-operated guest tool 34 (guest tool A or guest tool B).

On the other hand, in the case of determining that the host tool 32 is used in step S202 (step S202: No), the processing proceeds to step S212. In step S212, the arrangement unit 27 arranges the position of the pointer P currently arranged in the host processing list 36 at a position returned one time before toward a previous position from the cent position (step S212).

Next, the registration unit 26 determines whether the operational information of the processing information 37 subjected to the undo operation is operated by using any one of the guest tools 34 (step S214). In the case of negative determination in step S214 (step S214: No), the processing proceeds to step S218 described later.

In the case of positive determination in step S214 (step S214: Yes), the processing proceeds to step S216. In step S216, the processing list 38 (processing list 38A or processing list 38B) corresponding to the guest tool 34 (guest tool A or guest tool B) determined in step S214 is updated based on the processing, information 37. The processing information 37 is located in the host processing list 36 and pointed by the pointer P arranged in step S212 (step S216).

Next, in step S218, the display controller 28 updates the display image 50 in a manner similar to step S210 (step S218). Then, the processing ends.

Next, another exemplary procedure of processing the interrupt executed by the image processing apparatus 10 in the image processing illustrated in FIG. 9 will be described. FIG. 11 is a flowchart illustrating an exemplary procedure of processing the interrupt in the case of receiving redo operation. The operation of FIG. 10 is performed under control of the CPU 60.

First, it is determined whether the reception unit 22 receives redo operation (step S300). In the case of negative determination in step S300 (step S300: No), the processing ends. In the case of positive determination in step S300 (step S300: Yes), the processing proceeds to step S302.

In step S302, the determination unit 25 determines whether any one of the guest tools 34 is used for the redo operation received in step S300 (step S302). In the case of determining that any one of the guest tools 34 is used (step S302: Yes), the processing proceeds to step S304.

Iii step S304, the arrangement unit 27 arranges, at a position advanced one time from a current position, the pointer P currently arranged in a processing list 38 (processing list 38A or processing list 38B) corresponding to the guest tool 34 (guest tool A or guest tool B) used for the redo operation (step S304).

Next, the arrangement unit 27 registers, at the tail end of the host processing list 36, processing information 37 including; identifying information of the guest tool 34 (guest tool A or guest tool B) used for the redo operation; information indicating the redo operation; and logical structure information (step S306). Additionally, the arrangement unit 27 arranges the current position of the pointer P located in the host processing list 36 at a position advanced one time (step S308), As a result of the processing in step S308, the pointer P is arranged at the position of the processing information 37 located in the host processing list 36 and registered in step S306.

Next, the display controller 28 updates a display image 50 (step S310). In other words, for example, the display controller 28 displays the display image 50 based on the logical structure information included in the processing information 37. The processing information 37 is located in each of the processing lists 38 (processing list 38A and processing list 38B) corresponding to each of the plurality of guest tools 34 and has the pointer P arranged. Then, the present routine ends.

Therefore, the display image 50 in which the redo operation may be effected only for the operated guest tool 34 (guest tool A or guest tool B) is displayed. Furthermore, the redo operation is not applied to the display image 50 for a non-operated guest tool 34 (guest tool A or guest tool B).

On the other hand, in the case of determining that the host tool 32 is used in step S302 (step S302: No), the processing proceeds to step S312. In step S312, the arrangement unit 27 arranges the position of the pointer P currently arranged in the host processing list 36 at a position advanced one time from the current position (step S312).

Next, the registration unit 26 determines whether the operational information of the processing information 37 subjected to the redo operation is operated by using any guest tool 34 (step S314). In the case of negative determination in step S314 (step S314: No), the processing proceeds to step S318 described later.

In the case of positive determination in step S314 (step S314: Yes), the processing proceeds to step S316. In step S316, the processing, list 38 (processing list 38A or processing list 38B) corresponding to the guest tool 34 (guest tool A or guest tool B) determined in step S314 is updated based on the processing information 37. The processing information 37 is located in the host processing list 36 and pointed by the pointer P arranged in step S312 (step S316).

Next, in step S318, the display controller 28 updates the display image 50 in a manner similar to step S310 (step S318). Then, the processing ends.

As described above, the image processing apparatus 10 of the present embodiment includes the reception unit 22, determination unit 25, registration unit 26, arrangement unit 27, and display controller 28. The reception unit 22 receives the operational information in operational content operated by a user for an object 52 by using any one of the plurality of guest tools 34 to provide an extended function related to image editing. The determination unit 25 determines the guest tool 34 used to operate the operational content indicating the received operational information. Every time the operational information is received, the registration unit 26 registers the processing information 37 including the received operational information in a processing list 38 corresponding to the determined guest tool 34 in receiving order of the operational information. Every time the operational information is received, the arrangement unit 27 arranges the pointer P adapted to point a current position at the processing information 37 located in the processing list 38 and including the latest received operational information. The display controller 28 displays a display image 50 including an object 52 sequentially subjected to editing processing in accordance with each of the processing information located in each of the processing lists 38. corresponding to each of the plurality of guest tools 34. The processing includes processing information from the first-registered processing information 37 to the processing information 37 having the pointer P currently arranged.

Thus, in the image processing apparatus 10 of the present embodiment, the processing list 38 is controlled for each of the guest tools 34, and the display image 50 is displayed by using these processing lists 38. Therefore, the editing processing performed via one guest tool 34 can be prevented from influencing editing processing performed via another guest tool 34.

Therefore, work efficiency can be improved in the case of performing image editing by using the plurality of guest tools 34 in the image processing apparatus 10 of the present embodiment.

The processing information 37 includes operational information, identifying information of an object 52 subjected to operation of operational content indicating the operational information, and logical structure information of a display image 50 displayed by the mentioned operation.

The logical structure information includes current editing state information of each object 52 included in the display image 50, identifying information of the object 52 corresponding to operational content indicating the operational information, and identifying information of the guest tool 34 used to operate the operational content.

The display controller 28 displays the display image 50 based on the logical structure information included in the processing information 37. The processing information 37 is located in each of the processing lists 38 corresponding to each of the plurality of guest tools 34 and has the pointer P currently arranged.

The reception unit 22 receives undo operation or redo operation by a user via any one of the plurality of guest tools 34. In the case of receiving the undo operation, the arrangement unit 27 arranges, at a position returned toward a previous position from a current position, the position of the pointer P currently arranged in the processing list 38 corresponding to the guest tool 34 used for the undo operation. In the case of receiving the redo operation, the arrangement unit 27 arranges, at a position advanced from the current position, the position of the pointer P currently arranged in the processing list 38 corresponding to the guest tool 34 used for the redo operation.

The reception unit 22 further receives operational information indicating operational content operated by a user for an object 52 by using the host tool 32 to provide a basic function related to image editing. The determination unit 25 determines whether the host tool 32 is used and also whether any one of the guest tools 34 is used to operate the operational content indicating the received operational information. In the case of determining that the host tool 32 is used, the registration unit 26 registers, in the host processing list 36, processing information 37 including the received operational information. In the case of determining that any one of the guest tools 34 is used, the registration unit 26 registers processing information 37 including the received operational information in a processing list 38 corresponding to the determined guest tool 34 and the host processing list 36 corresponding to the host tool 32. Every time the operational information is received, the arrangement unit 27 arranges the pointer P adapted to point a current position at the processing information 37 located in each of the processing list 38 and the host processing list 36 and including latest received operational information.

The reception unit 22 further receives undo operation by the user via the host tool 32. In the case of receiving the undo operation via the host tool 32, the arrangement unit 27 arranges, at a position returned toward a previous position from the current position, the position of the pointer P arranged in the host processing list 36. In the case of receiving the undo operation via the host tool 32, the registration unit 26 updates the processing list 38 corresponding to the guest tool 34 used to operate the operational content indicating the operational information included in the processing information 37 based on the processing information 37. The processing information 37 is located in the host processing list 36 and has the pointer P arranged at the position returned by the arrangement unit 27.

The reception unit 22 further receives the redo operation by the user via the host tool 32. In the case of receiving the redo operation via the host tool 32, the arrangement unit 27 arranges, at a position advanced from a current position, the position of the pointer P currently arranged in the host processing list 36. In the case of receiving the redo operation via the host tool 32, the registration unit 26 updates the processing list 38 corresponding to the guest tool 34 used to operate the operational content indicating the operational information included in the processing information 37 based on the processing information 37. The processing information 37 is located in the host processing list 36 and has the pointer P arranged at the position advanced by the arrangement unit 27.

While the present embodiment has been described above, note that the above-described embodiment is provided as an example and not intended to be limit the scope of the invention. The above-described novel embodiment can be implemented by other various embodiments, and various kinds of omission, replacement, and modification can be made in a range not departing from the gist of the invention. The above-described embodiment and a modification of the embodiment may be included in the scope and the gist of the invention and also included in the invention recited in claims and in a scope equivalent thereto.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, including a host tool that provides a basic function of the image processing apparatus and a plurality of guest tools that each provide an extended function, comprising:
   circuitry to
   receive, sequentially, a plurality of processing information items, each indicating a content of a user operation performed to generate or edit an object using corresponding to either the host tool or one of the plurality of guest tools;
   determine a particular tool from among the host tool and the plurality of guest tools corresponding to a currently received processing information item;
   register the currently received processing information item of the determined particular tool in a particular processing list corresponding to the determined particular tool that was determined from among the host tool and the plurality of guest tools, each of the plurality of guest tools having a corresponding separate processing list and the host tool having a corresponding host processing list;
   set a pointer to point to the currently received processing information item in the particular processing list, in response to receiving the currently received processing information item; and
   display a display image including the object generated by sequentially performing editing according to one or more of the received processing information items of the host tool or the plurality of guest tools.

2. The image processing apparatus according to claim 1, wherein each processing information item includes:
   operational information indicating a content of each one of a plurality of user operations sequentially performed to generate or edit the object;
   identifying information of the object indicated by the operational information; and
   logical structure information of the display image.

3. The image processing apparatus according to claim 2, wherein the logical structure information includes:
   current editing state information of the object included in the display image;
   identifying information of the object corresponding to a content of a particular user operation indicated by the operational information; and
   identifying information of a particular guest tool of the plurality of guest tools used by the particular user operation.

4. The image processing apparatus according to claim 3, wherein the display image is displayed based on the logical structure information of the processing information item pointed to with the pointer, and obtained from each one of the plurality of processing lists corresponding to the plurality of guest tools.

5. The image processing apparatus according to claim 1, wherein the circuitry is further configured to:
   receive an undo operation or a redo operation via a particular guest tool of the plurality of guest tools;
   change a position of the pointer in the processing list corresponding to the particular guest tool used to perform the undo operation, from the current position to a previous position, when receiving the undo operation; and
   change a position of the pointer in the processing list corresponding to the particular guest tool used to perform the redo operation, from the current position to an advanced position, when receiving the redo operation.

6. The image processing apparatus according to claim 1, wherein the circuitry is further configured to:
   receive an undo operation or a redo operation via the host tool;
   change a position of the pointer in the host processing list corresponding to the host tool, from the current position to a previous position, when receiving the undo operation; and
   change a position of the pointer in the host processing list corresponding to the host tool, from the current position to an advanced position, when receiving the redo operation.

7. An image processing method executed by an image processing apparatus, including a host tool that provides a basic function of the image processing apparatus and a plurality of guest tools that each provide an extended function, the method comprising:
   receiving, sequentially, a plurality of processing information items each indicating a content of a user operation performed to generate or edit an object using corresponding to either the host tool or one of the plurality of guest tools;
   determining a particular tool from among the host tool and the plurality of guest tools corresponding to a currently received processing information item;
   registering the currently received processing information item of the determined particular tool in a particular processing list corresponding to the determined particular tool that was determined from among the host tool and the plurality of guest tools, each of the plurality of guest tools having a corresponding separate processing list and the host tool having a corresponding host processing list;
   setting a pointer to point to the currently received processing information item in the particular processing list, in response to receiving the currently received processing information item; and
   displaying a display image including the object generated by sequentially performing editing according to one or more of the received processing information items of the host tool or the plurality of guest tools.

8. A non-transitory recording medium which, when executed by circuitry of an image processing apparatus that includes a host tool that provides a basic function of the image processing apparatus and a plurality of guest tools that each provide an extended function, causes the circuitry to perform an image processing method comprising:
   receiving, sequentially, a plurality of processing information items, each indicating a content of a user operation performed to generate or edit an object using corresponding to either the host tool or one of the plurality of guest tools;
   determining a particular tool from among the host tool and the plurality of guest tools corresponding to a currently received processing information item;
   registering the currently received processing information item of the determined particular tool in a particular processing list corresponding to the determined particular tool that was determined from among the host tool and the plurality of guest tools, each of the plurality of guest tools having a corresponding separate processing list and the host tool having a corresponding host processing list;
   setting a pointer to point to the currently received processing information item in the particular processing list, in response to receiving the currently received processing information item; and
   displaying a display image including the object generated by sequentially performing editing according to one or more of the received processing information items of the host tool or the plurality of guest tools.

* * * * *